(12) United States Patent
Araki et al.

(10) Patent No.: US 9,317,039 B2
(45) Date of Patent: Apr. 19, 2016

(54) INVERTED PENDULUM TYPE VEHICLE

(71) Applicant: HONDA MOTOR CO., LTD., Tokyo (JP)

(72) Inventors: Makoto Araki, Wako (JP); Makoto Hasegawa, Wako (JP); Shinichiro Kobashi, Wako (JP); Shinya Shirokura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 104 days.

(21) Appl. No.: 14/225,777

(22) Filed: Mar. 26, 2014

(65) Prior Publication Data
US 2014/0297127 A1   Oct. 2, 2014

(30) Foreign Application Priority Data
Mar. 29, 2013   (JP) ................................. 2013-074051

(51) Int. Cl.
*G05D 1/02*   (2006.01)
*B62K 3/00*   (2006.01)
*B62K 1/00*   (2006.01)

(52) U.S. Cl.
CPC ............... *G05D 1/0268* (2013.01); *B62K 1/00* (2013.01); *B62K 3/007* (2013.01)

(58) Field of Classification Search
CPC ............... B62K 3/007; B62K 2207/02; B62K 2207/04; G05D 1/0268
USPC ............ 701/124; 700/279; 180/282, 7.1, 316, 180/315
See application file for complete search history.

(56) References Cited

U.S. PATENT DOCUMENTS

| | | |
|---|---|---|
| 5,385,210 A | 1/1995 | Harvey |
| 5,791,425 A | 8/1998 | Kamen et al. |
| 5,971,091 A | 10/1999 | Kamen et al. |
| 6,302,230 B1 | 10/2001 | Kamen et al. |
| 6,827,163 B2 | 12/2004 | Amsbury et al. |
| 6,840,346 B2 | 1/2005 | Sugitani et al. |
| 7,690,452 B2 * | 4/2010 | Kamen ............... B60L 15/2036 180/282 |
| 7,740,099 B2 | 6/2010 | Field et al. |

(Continued)

FOREIGN PATENT DOCUMENTS

| EP | 2 045 180 A1 | 4/2009 |
|---|---|---|
| EP | 2 052 924 A1 | 4/2009 |

(Continued)

OTHER PUBLICATIONS

European Office Communication for European Application No. 14161447.9, dated Jul. 23, 2015.

(Continued)

*Primary Examiner* — Thomas G Black
*Assistant Examiner* — Sara Lewandroski
(74) *Attorney, Agent, or Firm* — Birch, Stewart, Kolasch & Birch, LLP

(57) ABSTRACT

An inverted pendulum type vehicle for improving the steering performance and the comfort of the vehicle. A control device of an inverted pendulum type vehicle including a moving motion unit driven by an actuator device controls the actuator device so that the position of the center of gravity of the entirety of an occupant riding on an occupant riding section and the vehicle is shifted from the position of a balance state in the request direction of movement of the center of gravity of the occupant recognized from a predetermined kind of state of the vehicle.

14 Claims, 9 Drawing Sheets

(56) References Cited

U.S. PATENT DOCUMENTS

| | | | |
|---|---|---|---|
| 7,963,352 B2 | 6/2011 | Alexander | |
| 8,050,837 B2 | 11/2011 | Yamada | |
| 8,353,378 B2 | 1/2013 | Gomi et al. | |
| 8,408,339 B2 | 4/2013 | Makino | |
| 8,467,922 B2 | 6/2013 | Takenaka | |
| 8,467,948 B2 | 6/2013 | Takenaka et al. | |
| 8,522,902 B2 | 9/2013 | Gomi et al. | |
| 8,583,302 B2 | 11/2013 | Akimoto et al. | |
| 8,751,110 B2 | 6/2014 | Takenaka et al. | |
| 8,758,191 B2 | 6/2014 | Takenaka et al. | |
| 9,037,331 B2 | 5/2015 | Taira et al. | |
| 9,085,334 B2 | 7/2015 | Hoffmann et al. | |
| 2001/0032743 A1 | 10/2001 | Kamen et al. | |
| 2002/0023787 A1 | 2/2002 | Kamen et al. | |
| 2004/0069543 A1* | 4/2004 | Kamen | A61G 5/046 180/7.1 |
| 2004/0201271 A1 | 10/2004 | Kakinuma et al. | |
| 2005/0121238 A1* | 6/2005 | Ishii | A63C 17/08 180/65.1 |
| 2005/0121866 A1* | 6/2005 | Kamen | A63C 17/01 280/47.18 |
| 2005/0126833 A1 | 6/2005 | Takenaka et al. | |
| 2007/0084662 A1* | 4/2007 | Oikawa | A63C 17/08 180/272 |
| 2007/0158117 A1 | 7/2007 | Alexander | |
| 2007/0251735 A1* | 11/2007 | Kakinuma | A63C 17/08 180/6.5 |
| 2007/0296170 A1 | 12/2007 | Field et al. | |
| 2008/0161990 A1 | 7/2008 | Gansler | |
| 2008/0245594 A1* | 10/2008 | Ishii | B62D 37/00 180/218 |
| 2008/0271938 A1 | 11/2008 | Gulak | |
| 2009/0055033 A1 | 2/2009 | Gansler et al. | |
| 2009/0105908 A1 | 4/2009 | Casey et al. | |
| 2009/0288900 A1 | 11/2009 | Takenaka et al. | |
| 2010/0017069 A1* | 1/2010 | Miki | B60N 2/0244 701/48 |
| 2010/0030440 A1 | 2/2010 | Kosaka | |
| 2010/0030441 A1 | 2/2010 | Kosaka | |
| 2010/0030442 A1 | 2/2010 | Kosaka | |
| 2010/0038960 A1 | 2/2010 | Takenaka et al. | |
| 2010/0070132 A1* | 3/2010 | Doi | B60L 15/20 701/36 |
| 2010/0071984 A1* | 3/2010 | Doi | B62K 3/007 180/218 |
| 2010/0096905 A1 | 4/2010 | Takenaka et al. | |
| 2010/0114420 A1* | 5/2010 | Doi | B60N 2/0244 701/31.4 |
| 2010/0114421 A1 | 5/2010 | Doi | |
| 2010/0114468 A1* | 5/2010 | Field | B60N 2/045 701/124 |
| 2010/0152987 A1 | 6/2010 | Gorai | |
| 2010/0168993 A1* | 7/2010 | Doi | B60L 15/00 701/124 |
| 2010/0235028 A1 | 9/2010 | Ishii | |
| 2010/0299044 A1 | 11/2010 | Miyake et al. | |
| 2011/0010066 A1 | 1/2011 | Fuwa | |
| 2011/0035101 A1* | 2/2011 | Kawada | A61G 5/043 701/36 |
| 2011/0060518 A1* | 3/2011 | Kosaka | B62K 3/007 701/124 |
| 2011/0067936 A1 | 3/2011 | Takenaka et al. | |
| 2011/0070998 A1* | 3/2011 | Takenaka | B60B 19/003 476/68 |
| 2011/0071714 A1 | 3/2011 | Takenaka | |
| 2011/0071715 A1 | 3/2011 | Akimoto et al. | |
| 2011/0071752 A1* | 3/2011 | Takenaka | B60L 15/10 701/124 |
| 2011/0098884 A1* | 4/2011 | Doi | B62K 3/007 701/36 |
| 2011/0118968 A1* | 5/2011 | Takenaka | B62K 1/00 701/124 |
| 2011/0130925 A1 | 6/2011 | Oikawa | |
| 2011/0166713 A1* | 7/2011 | Tsuji | B62K 1/00 700/279 |
| 2011/0209929 A1* | 9/2011 | Heinzmann | B62J 17/08 180/6.2 |
| 2011/0209932 A1 | 9/2011 | Takenaka et al. | |
| 2011/0213522 A1 | 9/2011 | Stevens et al. | |
| 2011/0233989 A1 | 9/2011 | Takenaka et al. | |
| 2011/0264350 A1* | 10/2011 | Doi | B60L 15/20 701/90 |
| 2012/0046856 A1* | 2/2012 | Doi | B60L 15/20 701/124 |
| 2012/0123647 A1* | 5/2012 | Doi | B60L 15/20 701/49 |
| 2012/0166048 A1 | 6/2012 | Inoue et al. | |
| 2012/0173041 A1 | 7/2012 | Takenaka et al. | |
| 2012/0173042 A1 | 7/2012 | Takenaka et al. | |
| 2012/0173086 A1 | 7/2012 | Takenaka et al. | |
| 2012/0217072 A1* | 8/2012 | Hoffmann | B60T 7/042 180/21 |
| 2012/0232757 A1* | 9/2012 | Oikawa | B60L 15/2036 701/41 |
| 2013/0133959 A1 | 5/2013 | Kamiyama et al. | |
| 2013/0299254 A1 | 11/2013 | Mutoh et al. | |
| 2013/0299263 A1 | 11/2013 | Shimizu et al. | |
| 2014/0188338 A1* | 7/2014 | Ito | B62D 51/001 701/41 |
| 2014/0236426 A1 | 8/2014 | Kosaka et al. | |
| 2014/0330507 A1 | 11/2014 | Oikawa | |

FOREIGN PATENT DOCUMENTS

| | | |
|---|---|---|
| EP | 2 163 467 A1 | 3/2010 |
| EP | 2 319 750 A1 | 5/2011 |
| GB | 2242173 A | 9/1991 |
| JP | 2004/129435 A | 4/2004 |
| JP | 20 2007 007 673 U1 | 10/2007 |
| JP | 4181113 B2 | 11/2008 |
| JP | 2010-167807 A | 8/2010 |
| JP | 2010-167808 A | 8/2010 |
| JP | 2011-57111 A | 3/2011 |
| JP | 2011/063183 A | 3/2011 |
| JP | 2011-63183 A | 3/2011 |
| JP | 2011-063241 A | 3/2011 |
| JP | 2011-63243 A | 3/2011 |
| JP | 2011-68222 A | 4/2011 |
| TW | M424290 A1 | 3/2012 |
| WO | WO 02/30730 A2 | 4/2002 |
| WO | WO 2010/113439 A1 | 4/2004 |
| WO | 1 529 556 A2 | 5/2005 |
| WO | 1 632 428 A1 | 3/2006 |
| WO | WO 2008/132778 A1 | 11/2008 |
| WO | WO 2008/132779 A1 | 11/2008 |
| WO | WO 2011/033575 A1 | 3/2011 |
| WO | WO 2012/017335 A1 | 2/2012 |

OTHER PUBLICATIONS

U.S. Notice of Allowance, issued Feb. 25, 2015, for U.S. Appl. No. 14/273,075.

U.S. Office Action, issued Feb. 24, 2015, for U.S. Appl. No. 14/223,360.

Al-Hadithi et al., "Fuzzy Optimal Control for Double Inverted Pendulum", 7th IEEE Conference on Industrial Electronics and Applications (ICIEA), 2012, pp. 1-5.

Chen, "Analysis and Design of Robust Feedback Control Systems for a Nonlinear Two-Wheel Inverted Pendulum System", 2012 International Symposium on Computer, Consumer and Control, IEEE, 2012, 1 page. (abstract only).

Ghorbani et al., "Fault tolerant improvement with chaos synchronization using Fuzzy-PID control", 13th Iranian Conference on Fuzzy Systems (IFSC), IEEE, 2013, 5 pages.

Jiang et al., "High Gain Disturbance Observer and Its Application in Robust Control Attenuation", Proceeding of the IEEE International Conference on Information and Automation, IEEE, Aug. 2013, pp. 230-235.

Lee et al., "Application of Dynamic Inversion with Extended High-Gain Observers to Inverted Pendulum on a Cart", 2013 American Control Conference (ACC), Jun. 17-19, 2013, AACC, 4234-4238.

(56) References Cited

OTHER PUBLICATIONS

Phaoharuhansa et al., "Trajectory Tracking for Wheeled Inverted Pendulum Robot using Tilt Angle Control", IEEE, 2013, pp. 4288-4293.

Yang et al., "Neural Network-Based Motion Control of Underactuated Wheeled Inverted Pendulum Models", IEEE Transactions on Neural Networks and Learning Systems, vol. 25, No. 11, Nov. 2014, pp. 2004-2016.

Zhang et al., "Variable Gain Linear Quadratic Regulator and Its Application", Proceedings of 2014 IEEE International Conference on Mechatronics and Automation, Aug. 3-6, 2014, pp. 1745-1750.

U.S. Office Action, dated Sep. 3, 2015, for U.S. Appl. No. 14/223,360.

Extended European Search Report for Application 14169797.9 dated Oct. 7, 2014.

Extended European Search Report for Application 14169800.1 dated Oct. 7, 2014.

U.S. Office Action, dated Oct. 7, 2015, for U.S. Appl. No. 14/225,489.

U.S. Office Action, dated Oct. 9, 2015, for U.S. Appl. No. 14/246,846.

U.S. Appl. No. 14/225,471, dated Oct. 1, 2015.

U.S. Office Action, dated Jan. 25, 2016, for U.S. Appl. No. 14/244,279.

* cited by examiner

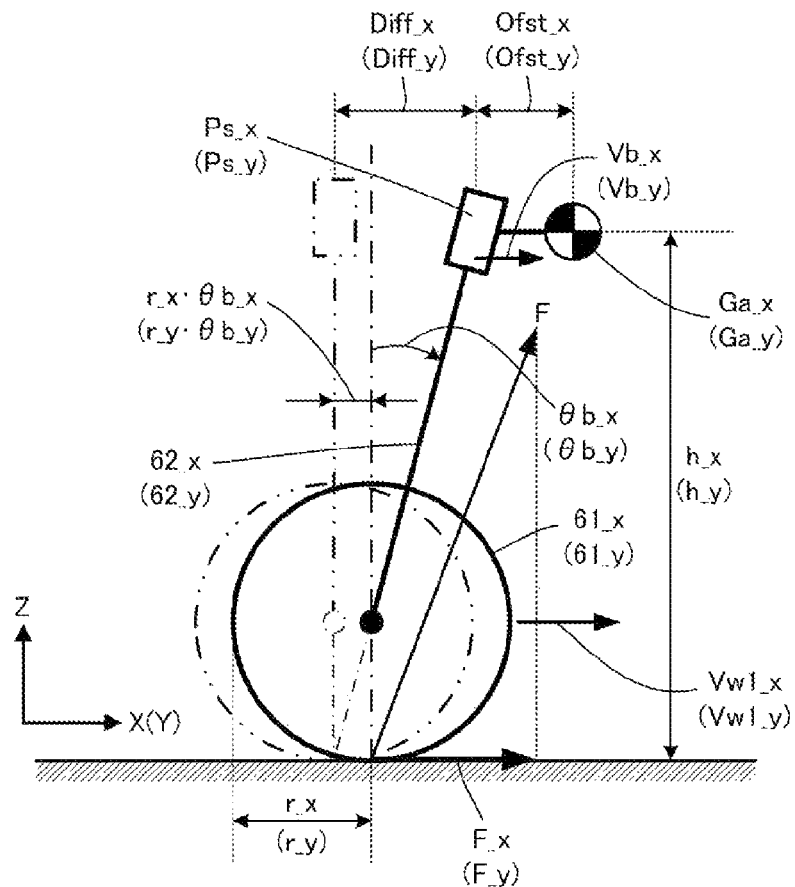
FIG.6
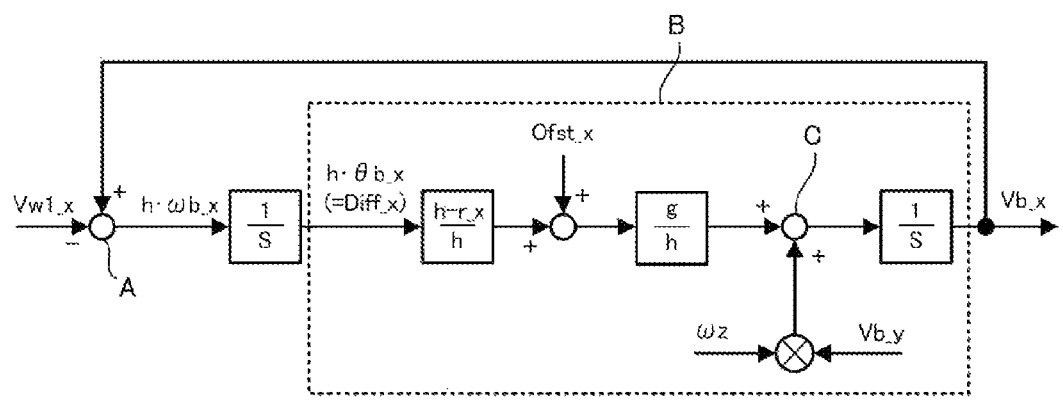

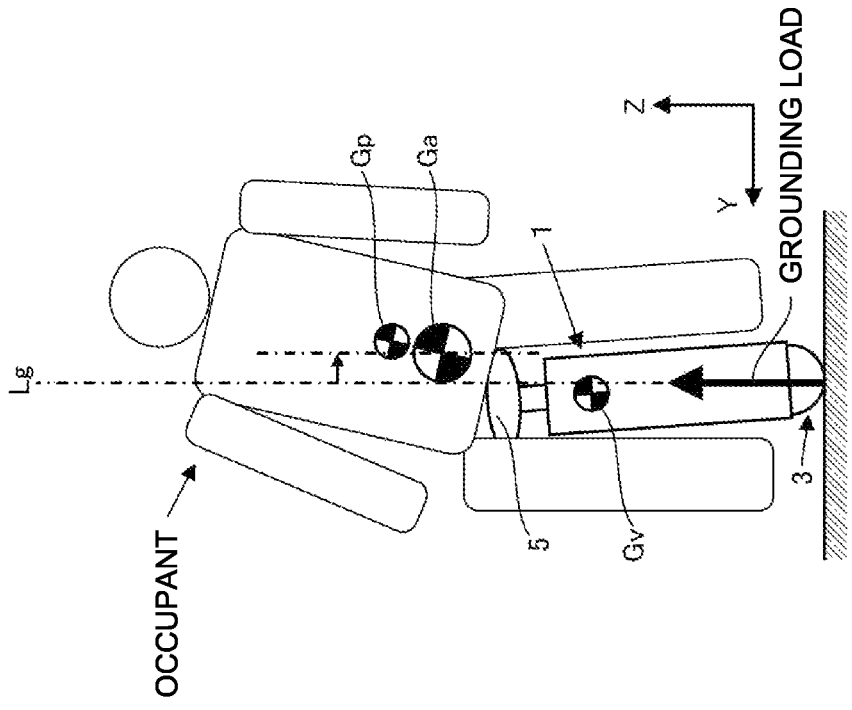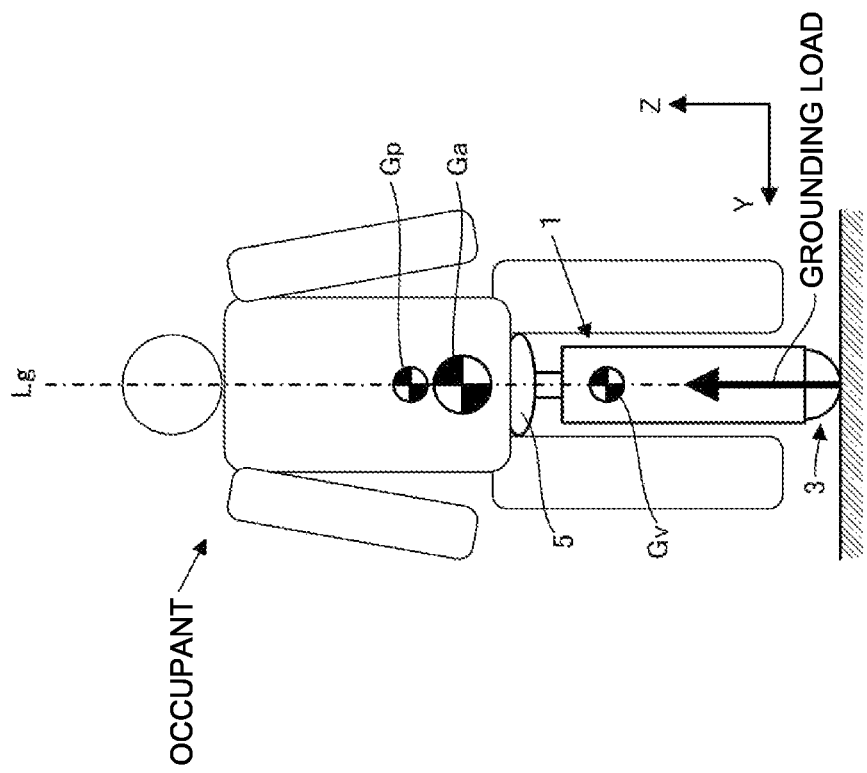

INVERTED PENDULUM TYPE VEHICLE

CROSS-REFERENCE TO RELATED APPLICATIONS

The present application claims priority under 35 USC 119 to Japanese Patent Application No. 2013-074051 filed Mar. 29, 2013 the entire contents of which are hereby incorporated by reference.

BACKGROUND OF THE INVENTION

1. Field of the Invention

The present invention relates to an inverted pendulum type vehicle configured to be capable of moving in all directions on a floor surface.

2. Description of Background Art

An inverted pendulum type vehicle including a moving motion unit configured to be capable of moving in all directions on a floor surface and a tilting section capable of tilting with respect to the vertical direction is known. See, for example, JP-A No. 2011-063241.

When utilized as a vehicle, the inverted pendulum type vehicle of this kind is provided with an occupant riding section in the tilting section. Also, the vehicle is moved by driving the moving motion unit by an actuator device according to the tilting and the like of the occupant riding section on which an occupant rides.

In an inverted pendulum type vehicle (may be hereinafter simply referred to as a vehicle) including an occupant riding section, basically, it is considered to be preferable to control the movement of a moving motion unit making a state where the center of gravity of the entirety of an occupant riding on the occupant riding section and the vehicle is positioned on the action line of the grounding load applied to the moving motion unit in other words, a state where the center of gravity of the entirety is positioned just above the action center point of the grounding load (so-called floor reaction force center point); a dynamically balanced state considering a centrifugal force when the vehicle turns; (these states may be hereinafter generically referred to as a balance state) a stationary convergence target at the time the vehicle does not turn.

However, it was revealed by various experiments and studies by the inventor of the present application that there was a case where the steering performance and the riding quality of the vehicle were spoiled as shown below when movement of the moving motion unit was controlled so that the center of gravity of the entirety was constantly converged to the balance state.

More specifically, the occupant normally tries to move the center of gravity of the occupant himself or herself relatively to the occupant riding section according to movement of the vehicle. For example, when the vehicle is to be turned or when the vehicle is to be translationally moved comparatively quickly, the occupant tries to move the center of gravity of the occupant himself or herself relatively to the occupant riding section to the center side of the turning radius of the vehicle or the side same as the direction of the translational movement of the vehicle.

However, when movement of the moving motion unit is controlled so that the center of gravity of the entirety is constantly converged to the balance state, the moving motion unit is moved so that the center of gravity of the entirety is maintained at the balance state, and therefore the occupant riding section becomes a tilted state so that the center of gravity of the vehicle moves to the direction opposite to the direction to which the occupant tries to move the center of gravity of the occupant himself or herself.

Therefore, the occupant feels that movement of the center of gravity of the occupant himself or herself has been offset by movement of the center of gravity of the vehicle, and may have a feeling of incongruity with respect to steering of the vehicle and the riding quality.

SUMMARY AND OBJECTS OF THE INVENTION

The present invention has been developed in view of such background, and an object of an embodiment is to provide an inverted pendulum type vehicle capable of further improving the steering performance and the comfort of the vehicle.

In order to achieve such an object, the inverted pendulum type vehicle according to an embodiment of the present invention is an inverted pendulum type vehicle including a moving motion unit configured to be capable of moving in all directions on a floor surface, an actuator device for driving the moving motion unit, a base that incorporates the moving motion unit and the actuator devices, an occupant riding section incorporated into the base so as to be tiltable with respect to the vertical direction, a tilting state detection unit that detects the tilting state of the occupant riding section and a control device configured to control the motion of the actuator devices so as to balance the position of a center of gravity of the entirety of an occupant riding on the occupant riding section and the inverted pendulum type vehicle according to the tilting state of the occupant riding section detected at least by the tilting state detection unit. The inverted pendulum type vehicle is further provided with vehicle state detection units that detect a predetermined kind of state of the inverted pendulum type vehicle for recognizing a moving request for the center of gravity of the occupant riding on the occupant riding section, and the control device is configured to control the actuator devices so that the position of the center of gravity of the entirety of the occupant riding on the occupant riding section and the inverted pendulum type vehicle is shifted from the position of a balance state of the center of gravity of the entirety in the direction of a request for movement of the center of gravity of the occupant recognized from a state detected by the vehicle state detection units.

According to an embodiment of the present invention, "the balance state of the center of gravity of the entirety" means a state where the position of the center of gravity of the entirety of the occupant riding on the occupant riding section and the inverted pendulum type vehicle (may be hereinafter simply referred to as a vehicle) is on the action line of the grounding load applied to the moving motion unit when the inverted pendulum type vehicle does not turn, and means a dynamically balanced state considering a centrifugal force when the vehicle turns.

According to an embodiment of the present invention, the control device controls the actuator devices so that the position of the center of gravity of the entirety is shifted from the position of the balance state of the center of gravity of the entirety in the direction of a request for movement of the center of gravity of the occupant which is recognized from a state detected by the vehicle state detection units.

Therefore, with movement of the center of gravity of the occupant himself or herself being reflected to movement of the center of gravity of the entirety, the occupant can easily recognize by a physical sensation that movement of the moving motion unit is controlled according to it. Thus, it becomes easy for the occupant to execute to steer movement of the vehicle by movement of the body of the occupant himself or herself (and movement of the center of gravity of the occupant himself or herself). Therefore, according to the first invention, the steering performance and the comfort of the vehicle can be further improved.

According to an embodiment of the present invention, it is preferable that the predetermined kind of state detected by the vehicle state detection units includes at least one of, for example, a command of a turning request of the inverted pendulum type vehicle by the occupant riding on the occupant riding section, a measured value of an actual yaw rate of the inverted pendulum type vehicle, center of gravity of the entirety shift amount that is a relative moving amount of the center of gravity of the entirety with respect to the occupant riding section generated because the occupant riding on the occupant riding section relatively shifts the center of gravity of the occupant himself or herself with respect to the occupant riding section, and a temporal change rate of the center of gravity of the entirety shift amount.

Also, the command of the turning request means a command for executing the turning motion of the vehicle (a command for the control device). As the command, for example, a command can be employed which is generated by the control device or an appropriate detector (a detector sensitive to movement of the body of the occupant) according to the occupant moving the body of the occupant himself or herself.

According to an embodiment of the present invention, when the predetermined kind of state includes a command of a turning request of the inverted pendulum type vehicle by the occupant riding on the occupant riding section or a measured value of the actual yaw rate of the inverted pendulum type vehicle, the position of the center of gravity of the entirety can be shifted from the position of the balance state at the time of turning motion of the vehicle. For example, by making the direction toward the center side of the turning radius in turning motion of the vehicle the request direction of movement of the center of gravity of the occupant, the position of the center of gravity of the entirety can be shifted to the request direction from the position of the balance state. Thus, an effect that the turning operation of the vehicle by the occupant becomes easy is exerted.

Also, when the predetermined kind of state includes the center of gravity of the entirety moving amount or the temporal change rate of the center of gravity of the entirety moving amount, the center of gravity of the entirety can be shifted from the position of the balance state at the time of accelerating or decelerating the vehicle, or at the time of turning motion and the like. For example, by making the direction the same as that of the center of gravity of the entirety moving amount or the temporal change rate of the center of gravity of the entirety moving amount the request direction of movement of the center of gravity of the occupant, the position of the center of gravity of the entirety can be shifted to the request direction from the position of the balance state. Thus, an effect that operation of the vehicle by the occupant becomes easy is exerted.

According to an embodiment of the present invention, it is preferable that the control device is configured to control the actuator devices so as to change a shift amount of the center of gravity of the entirety from the position of the balance state according to a state detected by the vehicle state detection units or according to the state and the moving speed of a representative point of the inverted pendulum type vehicle.

The shift amount of the position of the center of gravity of the entirety from the position of the balance state may be made a shift amount suitable to the predetermined kind of state of the vehicle, or a shift amount suitable to the state and the moving speed of a representative point of the vehicle (for example, a point fixed with respect to the base or the occupant riding section, or the center of gravity of the entirety).

According to an embodiment of the present invention, it is preferable that the control device is configured to control the actuator devices so that the shift amount of the center of gravity of the entirety from the position of the balance state increases toward the center side of the turning radius of the inverted pendulum type vehicle as the magnitude of a request value of the yaw rate of the inverted pendulum type vehicle shown by the command of the turning request or the magnitude of the command value of the yaw rate is larger when the predetermined kind of state detected by the vehicle state detection units includes the command of the turning request or the measured value of the yaw rate.

According to an embodiment of the present invention, easiness of operation of the vehicle can be improved by shifting the position of the center of gravity of the entirety from the position of the balance state according to the magnitude of the centrifugal force at the time of turning motion of the vehicle.

According to an embodiment of the present invention, it is preferable that the control device is configured to control the actuator devices so that the shift amount of the position of the center of gravity of the entirety increases toward the direction same as that of the center of gravity of the entirety moving amount or the direction same as that of the temporal change rate of the center of gravity of the entirety moving amount as the magnitude of the center of gravity of the entirety moving amount is larger or as the magnitude of the temporal change rate of the center of gravity of the entirety moving amount is larger when the predetermined kind of state detected by the vehicle state detection units includes the center of gravity of the entirety moving amount or a temporal change rate of the center of gravity of the entirety moving amount.

According to an embodiment of the present invention, easiness of operation of the vehicle can be improved by shifting the position of the center of gravity of the entirety from the position of the balance state according to the magnitude of the inertia force accompanying acceleration and deceleration of the vehicle, or by shifting the position of the center of gravity of the entirety from the position of the balance state according to the magnitude of the centrifugal force at the time of turning motion of the vehicle.

Complementarily, according to an embodiment of the present invention, to control the actuator devices so as to shift the position of the center of gravity of the entirety from the position of the balance state can be achieved by such a configuration as described below for example.

More specifically, for example, the control device is configured so as to determine a manipulated variable (control input) for activating the actuator devices so that the deviation of the target inclination angle of the occupant riding section in a state where the center of gravity of the entirety is shifted from the position of the balance state and the observed value of the actual inclination angle of the occupant riding section shown by the inclination state of the occupant riding section detected by the inclination state detection unit converges to zero according to the deviation, and to control the actuator devices according to the manipulated variable. As the manipulated variable, for example, the drive force of the moving motion unit by the actuator devices, or the moving acceleration of the moving motion unit and the like can be employed.

Also, the center of gravity of the entirety moving amount can be estimated consecutively by such calculation as shown in the block diagram of FIG. 7 described below for example. That is, the estimate value of the center of gravity of the entirety moving amount can be determined consecutively so as to converge to the actual value by multiplying the deviation of a first estimate value and a second estimate value of the moving speed of the center of gravity of the entirety by a gain of a specific value determined beforehand.

More specifically, when the first estimate value and the second estimate value of the moving speed of the center of gravity of the entirety in the front/rear direction of the vehicle (the front/rear direction of the occupant riding on the occupant riding section for example) are expressed as Vb_estm1_x and Vb_estm2_x, respectively and the first estimate value and the second estimate value of the moving speed of the center of gravity of the entirety in the right/left direction of the vehicle (the right/left direction of the occupant riding on the occupant riding section for example) are expressed as Vb_estm1_y and Vb_estm2_y, respectively, the first estimate value Vb_estm1_x in the front/rear direction and the first estimate value Vb_estm1_y in the right/left direction are estimate values dynamically calculated by the expressions (Ax), (Ay) below, respectively. Also, the second estimate value Vb_estm2_x in the front/rear direction and the second estimate value Vb_estm2_y in the right/left direction are estimate values of the moving speed calculated by integrating the moving acceleration DVb_estm_x in the front/rear direction and the moving acceleration DVb_estm_y in the right/left direction of the center of gravity of the entirety dynamically calculated by the expressions (Bx), (By) below, respectively.

$$Vb\_estm1\_x = Vw1\_act\_x + h \cdot \omega b\_act\_x \quad (Ax)$$

$$Vb\_estm1\_y = Vw1\_act\_y + h \cdot \omega b\_act\_y \quad (Ay)$$

$$DVb\_estm\_x = (\theta b\_act\_x \cdot (h - r\_x) + Ofst\_estm\_x(k-1)) \cdot (g/h) + Vb\_estm1\_y \cdot \omega z\_act \quad (Bx)$$

$$DVb\_estm\_y = (\theta b\_act\_y \cdot (h - r\_y) + Ofst\_estm\_y(k-1)) \cdot (g/h) - Vb\_estm1\_x \cdot \omega z\_act \quad (By)$$

Wherein:

Vw1_act_x: the observed value of the moving speed in the front/rear direction of the moving motion unit Vw1_act_y: the observed value of the moving speed in the right/left direction of the moving motion unit h: a value determined beforehand as the height of the center of gravity of the entirety from the floor surface $\omega b\_act\_x$: the observed value of the angular velocity of tilting in the direction around the axis in the right/left direction of the occupant riding section $\omega b\_act\_y$: the observed value of the angular velocity of tilting in the direction around the axis in the front/rear direction of the occupant riding section $\theta b\_act\_x$: the observed value of the inclination angle (the inclination angle with respect to the vertical direction) in the direction around the axis in the right/left direction of the occupant riding section $\theta b\_act\_y$: the observed value of the inclination angle (the inclination angle with respect to the vertical direction) in the direction around the axis in the front/rear direction of the occupant riding section r_x: the height from the floor surface of the tilting center in the direction around the axis in the right/left direction of the occupant riding section r_y: the height from the floor surface of the tilting center in the direction around the axis in the front/rear direction of the occupant riding section Ofst_estm_x(k−1): the newest value out of the estimate values of the center of gravity of the entirety moving amount in the front/rear direction already calculated Ofst_estm_y(k−1): the newest value out of the estimate values of the center of gravity of the entirety moving amount in the right/left direction already calculated g: gravity acceleration constant Vb_estm1_x: the estimate value of the moving speed in the front/rear direction of the center of gravity of the entirety calculated by the expression (Ax)

Vb_estm1_y: the estimate value of the moving speed in the right/left direction of the center of gravity of the entirety calculated by the expression (Ay)

$\omega z\_act$: the angular velocity in the direction around the yaw-axis of the vehicle Also, the center of gravity of the entirety moving amount in the front/rear direction can be calculated by multiplying the deviation of the first estimate value Vb_estm1_x and the second estimate value Vb_estm2_x of the moving speed of the center of gravity of the entirety in the front/rear direction by a gain of a specific value determined beforehand. Similarly, the center of gravity of the entirety moving amount in the right/left direction can be calculated by multiplying the deviation of the first estimate value Vb_estm1_y and the second estimate value Vb_estm2_y of the moving speed of the center of gravity of the entirety in the right/left direction by a gain of a specific value determined beforehand.

Also, in the present specification, "the observed value" of an optional state quantity of the moving speed and the like means the detected value (measured value) of the actual value of the state quantity by an appropriate sensor, or the estimate value obtained from the detected value of one or more state quantity having a constant correlation with the state quantity based on the correlation, or a pseudo estimate value that can be deemed to agree or generally agree to the actual value of the state quantity. As the pseudo estimate value, the target value of the state quantity can be used.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5 is a drawing for explaining an inverted pendulum model used for processing of the first control processing unit shown in FIG. 3;

FIG. 6 is a block diagram showing a behavior in relation with the inverted pendulum model of FIG. 5;

FIGS. 10(a) and 10(b) are drawings showing an example of the action state of the inverted pendulum type vehicle of the first embodiment.

DETAILED DESCRIPTION OF THE PREFERRED EMBODIMENTS

Figure 1:
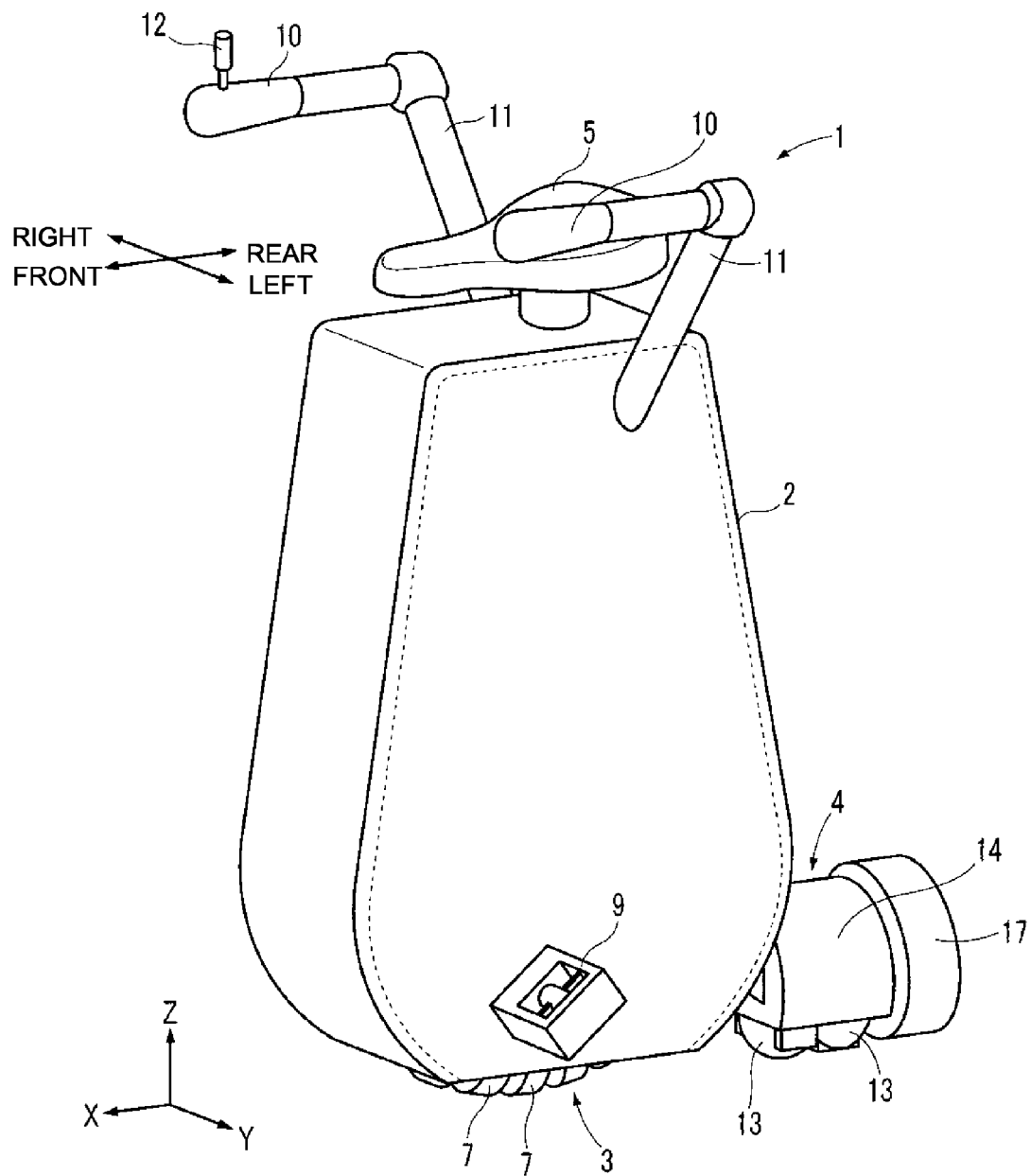
FIG. 1 is a perspective view of the outer appearance of the inverted pendulum type vehicle of the first embodiment of the present invention.
Figure 2:
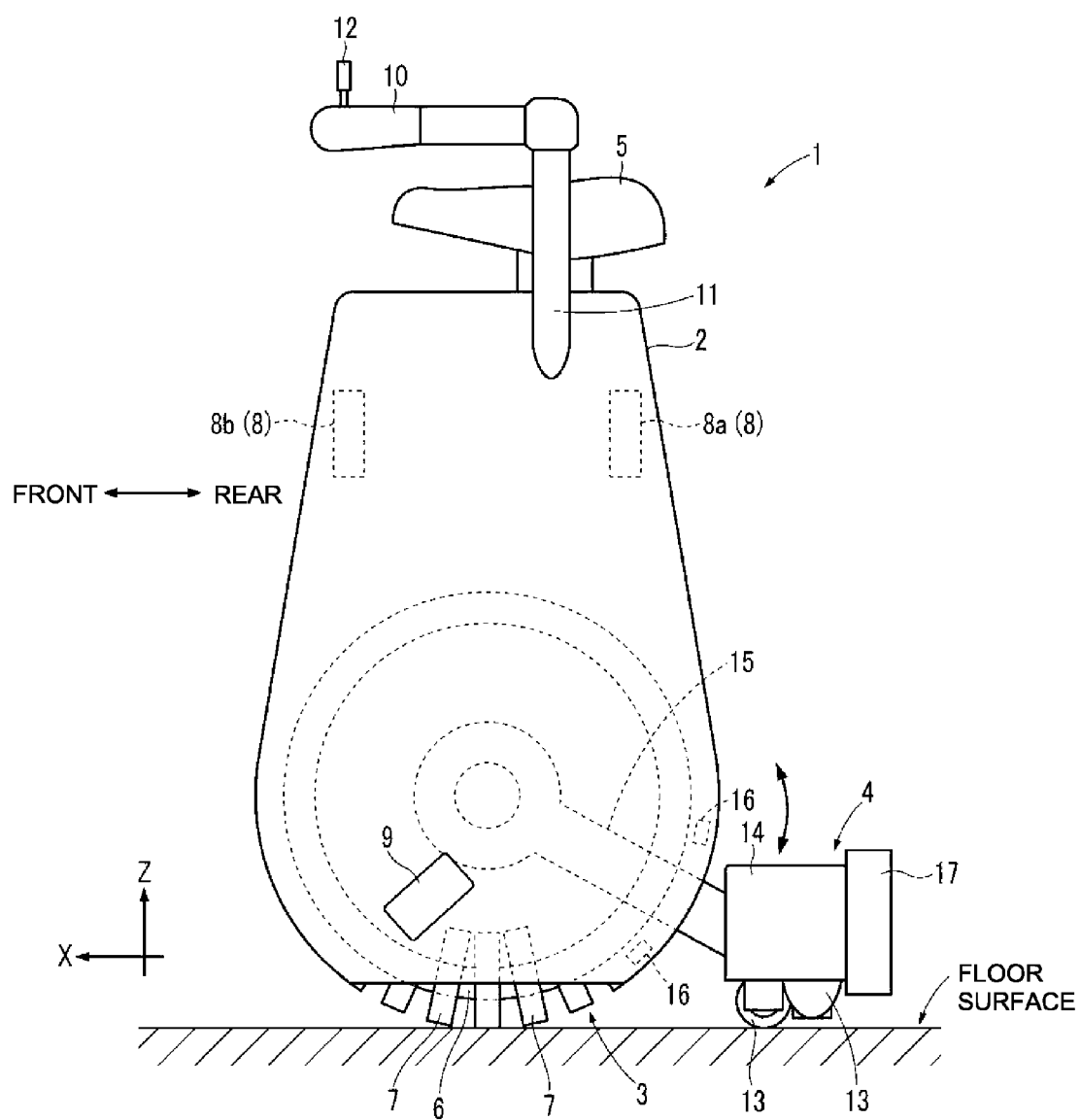
FIG. 2 is a side view of the inverted pendulum type vehicle of the first embodiment.

The first embodiment of the present invention will be described referring to FIG. 1-FIG. 10(b). As shown in FIG. 1 and FIG. 2, an inverted pendulum type vehicle 1 (may be hereinafter simply referred to as a vehicle 1) of the present embodiment includes a base 2, a first moving motion unit 3 and a second moving motion unit 4 capable of moving on a floor surface, and an occupant riding section 5 on which an occupant rides.

The first moving motion unit 3 corresponds to a moving motion unit in the present invention. The first moving motion unit 3 includes a core body 6 of an annular shape shown in FIG. 2 (hereinafter referred to as an annular core body 6), and a plurality of rollers 7 of an annular shape mounted on the annular core body 6 so as to be arrayed at equal angular intervals in the circumferential direction (the direction around the axis) of the annular core body 6. The respective rollers 7 are externally inserted to the annular core body 6 with their rotation axes being directed to the circumferential direction of the annular core body 6. Also, the respective rollers 7 are made rotatable integrally with the annular core body 6 around the axis of the annular core body 6, and are made rotatable around the axis of the cross section of the annular core body 6 (the circumferential axis around the axis of the annular core body 6).

The first moving motion unit 3 including these annular core body 6 and a plurality of rollers 7 is grounded on the floor surface through the roller 7 (the roller 7 positioned at the lower part of the annular core body 6) in a state where the axis of the annular core body 6 is directed parallel to the floor surface. It is configured that, by rotationally driving the annular core body 6 around the axis thereof in this grounded state, the annular core body 6 and all of the respective rollers 7 roll, and thereby the first moving motion unit 3 moves on the floor surface to the direction orthogonal to the axis of the annular core body 6. Also, it is configured that, by rotationally driving the respective rollers 7 around the rotational axes thereof in the grounded state, the first moving motion unit 3 moves to the axial direction of the annular core body 6.

Further, it is configured that, by executing rotational drive of the annular core body 6 and rotational drive of the respective rollers 7, the first moving motion unit 3 moves to the direction orthogonal to the axis of the annular core body 6 and the direction inclined with respect to the axial direction of the annular core body 6.

Thus, the first moving motion unit 3 can move to all direction on the floor surface. In the description below, as shown in FIG. 1 and FIG. 2, out of the moving directions of the first moving motion unit 3, the direction orthogonal to the axis of the annular core body 6 is made the X-axis direction, the axial direction of the annular core body 6 is made the Y-axis direction, and the vertical direction is made the Z-axis direction. Also, the forward direction is made the positive direction of the X-axis, the leftward direction is made the positive direction of the Y-axis, and the upward direction is made the positive direction of the Z-axis.

The first moving motion unit 3 is incorporated into the base 2. More specifically, the base 2 is arranged so as to cover the periphery of a portion excluding the lower part of the first moving motion unit 3 grounded on the floor surface. Also, the annular core body 6 of the first moving motion unit 3 is supported by the base 2 so as to be rotatable around the axis thereof.

In this case, the base 2 is made tiltable around the axis of the annular core body 6 of the first moving motion unit 3 (around Y-axis) with the axis of the annular core body 6 of the first moving motion unit 3 being a fulcrum, and is made tiltable around the X-axis orthogonal to the axis of the annular core body 6 with the grounding part of the first moving motion unit 3 being a fulcrum by being tilted with respect to the floor surfaced along with the first moving motion unit 3. Therefore, the base 2 is tiltable around two axes with respect to the vertical direction.

Also, inside the base 2, as shown in FIG. 2, a first actuator device 8 that generates a drive force for moving the first moving motion unit 3 is mounted. The first actuator device 8 is formed of an electric motor 8a as an actuator rotationally driving the annular core body 6 and an electric motor 8b as an actuator rotationally driving the respective rollers 7. Further, it is configured that the electric motors 8a, 8b impart rotational drive force to the annular core body 6 and the respective rollers 7 through power transmission mechanisms whose illustrations are omitted. Also, the power transmission mechanisms may have a known structure.

Note that, the first moving motion unit 3 may have a structure different from the structure described above. For example, as the structure of the first moving motion unit 3 and the drive system thereof, those having a structure proposed by the present applicant in PCT Unexamined International Application WO/2008/132778 or PCT Unexamined International Application WO/2008/132779 may be employed.

Also, the occupant riding section 5 is incorporated into the base 2. The occupant riding section 5 is formed of a seat on which the occupant sits, and is fixed to the upper end of the base 2. Further, the occupant can sit on the occupant riding section 5 with the occupant's front/rear direction being directed to the X-axis direction and the occupant's right/left direction being directed to the Y-axis direction. Also, because the occupant riding section 5 (seat) is fixed to the base 2, it is made tiltable with respect to the vertical direction integrally with the base 2. More specifically, the tilting condition or the rotating condition (around the Yaw axis) of the occupant riding section 5 and the tilting condition or the rotating condition of the base 2 are measured as equivalent ones.

Complementarily, the first moving motion unit 3 and the base 2 may be configured so as not to tilt (the attitude in the pitching direction and the rolling direction is maintained generally constant). In this case, the occupant riding section 5 may be configured so as to be tiltably supported by the base 2 through a ball joint and the like.

A pair of footrests 9, 9 on which the occupant sitting on the occupant riding section 5 places the occupant's feet and a pair of holders 10, 10 held by the occupant are further incorporated into the base 2.

The footrests 9, 9 are arranged projectingly in the lower part of both sides of the base 2. Also, in FIG. 1 and FIG. 2, an illustration of the footrest 9 on one side (right side) is omitted.

Further, the holders 10, 10 are ones having a bar shape disposed so as to extend in the X-axis direction (front/rear direction) on both sides of the occupant riding section 5 and are respectively fixed to the base 2 through rods 11 extended from the base 2. Also, a joy stick 12 as an operation tool is attached to one holder 10 (the holder 10 on the right side in the drawing) out of the holders 10, 10.

The joy stick 12 is made swingably operable in the front/rear direction (X-axis direction) and the right/left direction (Y-axis direction). Also, the joy stick 12 outputs operation signals showing the swing amount thereof in the front/rear direction (X-axis direction) and the direction of the swing (forward or rearward) thereof as an advancing/retreating command that makes the vehicle 1 move forward or rearward, and outputs operation signals showing the swing amount in the right/left direction (Y-axis direction) and the direction of the swing (rightward or leftward) thereof as a transverse moving command that makes the vehicle 1 move in the right/left direction.

In the present embodiment, the second moving motion unit 4 is formed of a so-called omni-wheel. The omni-wheel as the second moving motion unit 4 has a known structure including a pair of coaxial annular core bodies (illustration thereof is omitted) and a plurality of barrel-like rollers 13 externally inserted so as to be rotatable with the rotation axis being directed to the circumferential direction of the annular core bodies in the respective annular core bodies.

In this case, the second moving motion unit 4 is disposed on the rear side of the first moving motion unit 3 with the axis of the pair of annular core bodies being directed to the X-axis direction (front/rear direction), and is grounded to the floor surface through the rollers 13.

Note that, the roller 13 on one side and the roller 13 on the other side of the pair of annular core bodies are disposed so as to shift the phase in the circumferential direction of the annular core bodies, and it is configured that either one of the roller 13 on one side and the roller 13 on the other side of the pair of annular core bodies is grounded to the floor surface when the pair of annular core bodies rotate.

The second moving motion unit 4 formed of the omni-wheel is connected to the base 2. More specifically, the second moving motion unit 4 includes a case 14 that covers a portion on the upper side of the omni-wheel (the entirety of the pair of annular core bodies and the plural rollers 13), and the pair of annular core bodies of the omni-wheel are journaled to the case 14 so as to be rotatable around the axis of the pair of annular core bodies. Also, an arm 15 extended from the case 14 to the base 2 side is journaled to the base 2 so as to be swingable around the axis of the annular core bodies 6 of the first moving motion unit 3. Thus, the second moving motion unit 4 is connected to the base 2 through the arm 15.

Also, the second moving motion unit 4 is made swingable with respect to the base 2 around the axis of the annular core bodies 6 of the first moving motion unit 3 by swinging of the arm 15, and thereby, the occupant riding section 5 is made capable of tiltable around Y-axis along with the base 2 while both of the first moving motion unit 3 and the second moving motion unit 4 are grounded.

It may be also configured that the arm 15 is journaled to the axis section of the annular core bodies 6 of the first moving motion unit 3 and the second moving motion unit 4 is connected to the first moving motion unit 3 through the arm 15.

Also, in the base 2, a pair of stoppers 16, 16 that restrict the swing range of the arm 15 is arranged, and the arm 15 can swing within a range between the stoppers 16, 16. Thus, it is configured that the swing range of the second moving motion unit 4 around the axis of the annular core bodies 6 of the first moving motion unit 3 as well as the swing range of the base 2 and the occupant riding section 5 around X-axis are restricted, and the base 2 and the occupant riding section 5 are prevented from tilting excessively to the rear side of the occupant.

The second moving motion unit 4 may be energized by a spring so as to be pressed to the floor surface.

As described above, similarly to the first moving motion unit 3, the second moving motion unit 4 can move on the floor surface in all direction including the X-axis direction and the Y-axis direction by executing either one or both of rotation of the pair of annular core bodies of the second moving motion unit 4 and rotation of the rollers 13. More specifically, the second moving motion unit 4 is made movable in the Y-axis direction (right/left direction) by rotation of the annular core bodies, and is made movable in the X-axis direction (front/rear direction) by rotation of the rollers 13.

Also, to the case 14 of the second moving motion unit 4, an electric motor 17 as the second actuator device that drives the second moving motion unit 4 is attached. So as to rotationally drive a pair of annular core bodies of the second moving motion unit 4, the electric motor 17 is connected to the pair of annular core bodies.

Therefore, in the present embodiment, it is configured that the second moving motion unit 4 is moved in the X-axis direction in a subordinate manner following the movement of the first moving motion unit 3 in the X-axis direction, and the second moving motion unit 4 is moved in the Y-axis direction by rotatingly driving the pair of annular core bodies of the second moving motion unit 4 by the electric motor 17.

In addition, the second moving motion unit 4 may have a structure similar to that of the first moving motion unit 3.

The above is the mechanical configuration of the vehicle 1 in the present embodiment.

Figure 3:
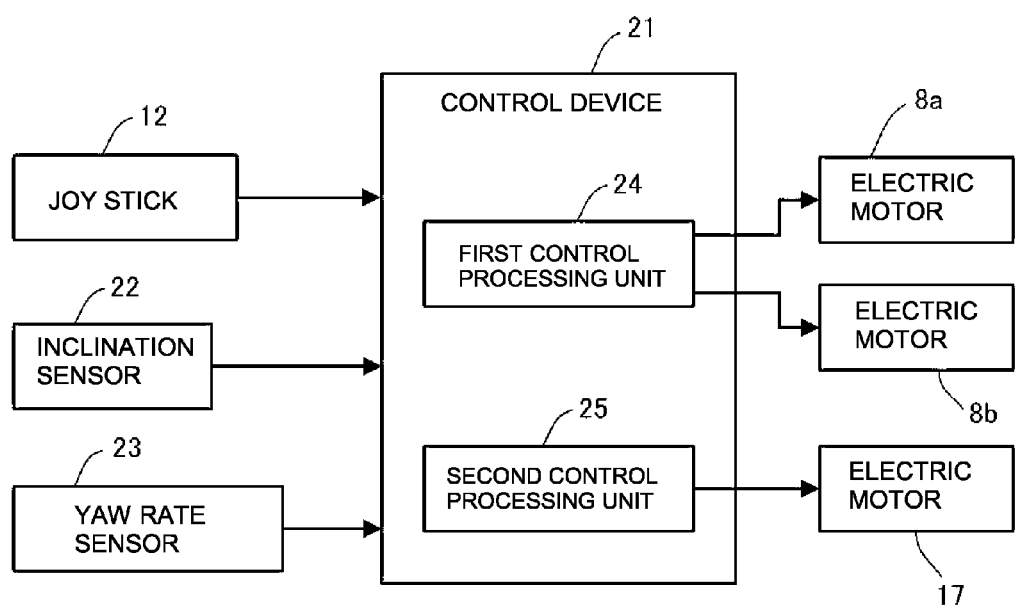
FIG. 3 is a block diagram showing a configuration for controlling the inverted pendulum type vehicle of the first embodiment.

Although illustration in FIG. 1 and FIG. 2 is omitted, on the base 2 of the vehicle 1 in the present embodiment, as a configuration for motion control of the vehicle 1 (motion control of the first moving motion unit 3 and the second moving motion unit 4), as shown in FIG. 3, a control device 21 formed of an electronic circuit unit including CPU, RAM, ROM and the like, an inclination sensor 22 for measuring the inclination angle of the occupant riding section 5 (the inclination angle of the base 2) with respect to the vertical direction, and a yaw rate sensor 23 for measuring the angular velocity around the yaw axis of the vehicle 1 are mounted.

Also, it is configured that the output of the joy stick 12 and the detection signals of the inclination sensor 22 and the yaw rate sensor 23 are inputted to the control device 21.

Also, the control device 21 may be formed into plural electronic circuit units that are capable of communicating with each other.

The inclination sensor 22 corresponds to the inclination state detection unit in the present invention, and is formed of an acceleration sensor and an angular velocity sensor such as a gyro-sensor and the like. Also, the control device 21 acquires the measured value of the inclination angle of the occupant riding section 5 (in other words, the inclination angle of the base 2) from the detection signals of these acceleration sensor and angular velocity sensor using a known method. As the method, for example, a method proposed by the applicant of the present application in Japanese Patent No. 4181113 may be employed.

Also, more specifically, the inclination angle of the occupant riding section 5 (or the inclination angle of the base 2) in the present embodiment is the inclination angle that makes the attitude of the occupant riding section 5 (or the base 2), in a state where the center of gravity of the entirety including the vehicle 1 and the occupant riding on the occupant riding section 5 of the vehicle 1 with a predetermined attitude (standard attitude) is positioned just above (above in the vertical direction) of the grounding part of the first moving motion unit 3, a reference (zero) (a set of the inclination angle in the direction around X-axis and the inclination angle in the direction around Y-axis).

Further, the yaw rate sensor 23 is formed of an angular velocity sensor such as a gyro-sensor and the like. Also, the control device 21 acquires the measured value of the angular velocity around the yaw axis of the vehicle 1 based on the detection signal of the angular velocity sensor.

Further, the control device 21 includes a first control processing unit 24 controlling the moving motion of the first moving motion unit 3 by controlling the electric motors 8a, 8b that form the first actuator device 8 and a second control processing unit 25 controlling the moving motion of the second moving motion unit 4 by controlling the electric motor 17 as the second actuator device in addition to the function for acquiring the measured values as described above as a function achieved by a mounted program and the like (function achieved by software) or a function formed by hardware.

By executing the calculation process described below, the first control processing unit 24 calculates the first target speed that is a target value of the moving speed of the first moving motion unit 3 (more specifically, a set of the translational speed in the X-axis direction and the translational speed in the Y-axis direction) one by one, and controls the rotational speed of the electric motors 8a, 8b so that the actual moving speed of the first moving motion unit 3 agrees to the first target speed.

In this case, the relation between each rotational speed of the electric motors 8a, 8b and the actual moving speed of the first moving motion unit 3 is determined beforehand, and it is configured that the target value of the rotational speed of the electric motors 8a, 8b is decided according to the first target speed of the first moving motion unit 3. Also, by feedback-control of the rotational speed of the electric motors 8a, 8b to the target value decided according to the first target speed, the actual moving speed of the first moving motion unit 3 is controlled to the first target speed.

Also, by executing the calculation processing described below, the second control processing unit 25 calculates the second target speed that is a target value of the moving speed of the second moving motion unit 4 (more specifically, the translational speed in the Y-axis direction) one by one, and controls the rotational speed of the electric motor 17 so that the actual moving speed of the second moving motion unit 4 in the Y-axis direction agrees to the second target speed.

In this case, similarly to the case of the first moving motion unit 3, the relation between the rotational speed of the electric motor 17 and the actual moving speed of the second moving motion unit 4 in the Y-axis direction is determined beforehand, and it is configured that the target value of the rotational speed of the electric motor 17 is decided according to the second target speed of the second moving motion unit 4. Also, by feedback-control of the rotational speed of the electric motor 17 to the target value decided according to the second target speed, the actual moving speed of the second moving motion unit 4 in the Y-axis direction is controlled to the second target speed.

In addition, in the present embodiment, the second moving motion unit 4 is moved in the X-axis direction in a subordinate manner following the movement of the first moving motion unit 3 in the X-axis direction. Therefore, it is not necessary to set the target value of the moving speed of the second moving motion unit 4 in the X-axis direction.

Next, processing of the first control processing unit 24 and the second control processing unit 25 will be described in more detail. First, processing of the first control processing unit 24 will be described referring to FIG. 4 to FIG. 8.

Figure 4:
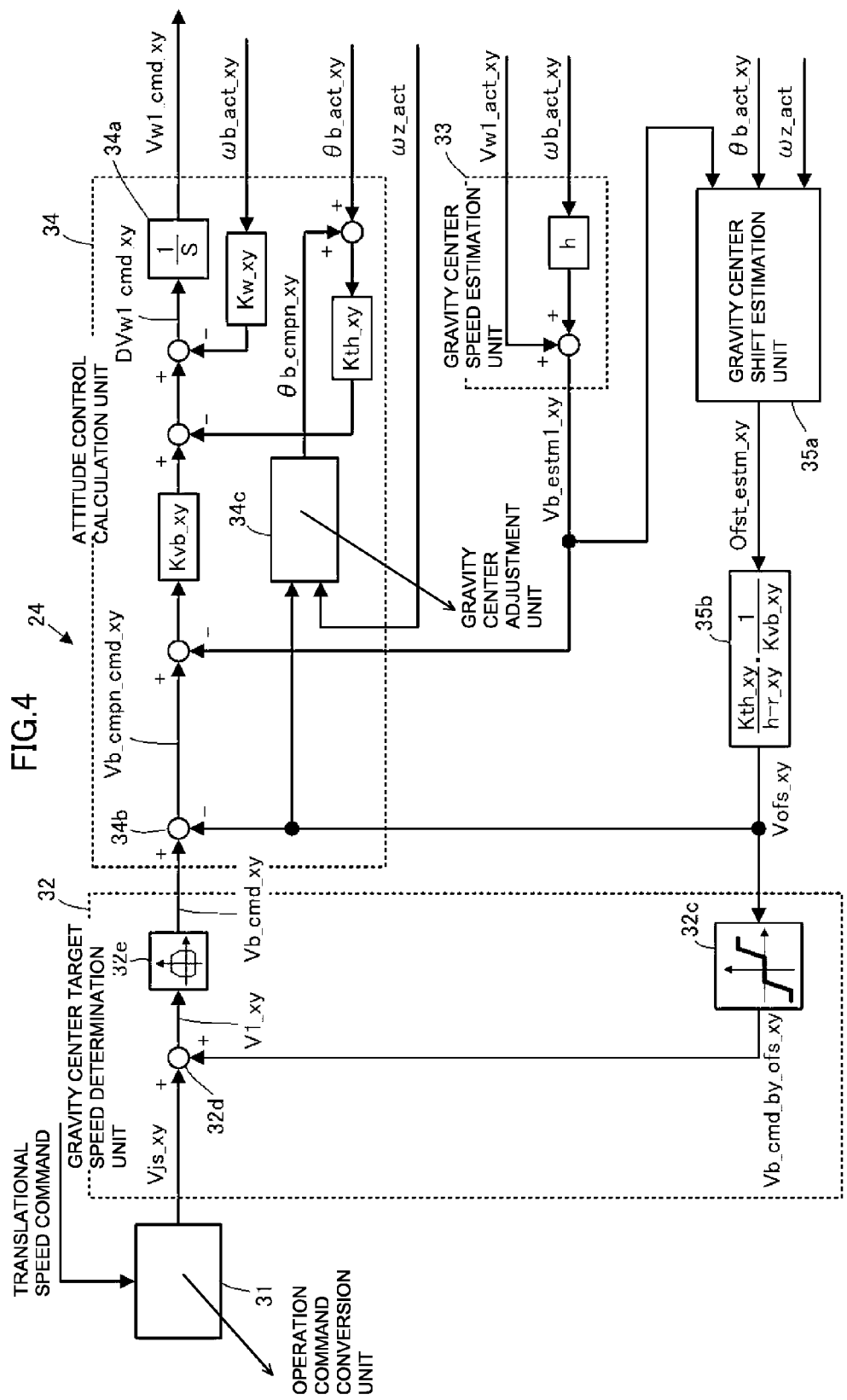
FIG. 4 is a block diagram showing processing of the first control processing unit shown in FIG. 3.

As shown in FIG. 4, the first control processing unit 24 includes, as main function units thereof, an operation command conversion unit 31 that converts the command inputted from the joy stick 12 (turning command and advancing/retreating command) to the speed command of the vehicle 1 in the X-axis direction (front/rear direction) and the Y-axis direction (right/left direction), a center of gravity target speed determination unit 32 that determines the target speed of the center of gravity of the entirety including the vehicle 1 and the occupant riding on the occupant riding section 5 thereof (hereinafter referred to as the vehicle system center of gravity of the entirety), a center of gravity speed estimation unit 33 that estimates the speed of the vehicle system center of gravity of the entirety, and an attitude control calculation unit 34 that determines the target value of the moving speed of the first moving motion unit 3 so as to control the attitude of the occupant riding section 5 (the attitude of the base 2) while making the speed of the vehicle system center of gravity of the entirety estimated follow the target speed. Also, the first control processing unit 24 executes processing of these respective function units at a predetermined calculation processing period of the control device 21.

Further, in the present embodiment, the vehicle system center of gravity of the entirety has a meaning as an example of the representative point of the vehicle 1. Therefore, the speed of the vehicle system center of gravity of the entirety means the moving speed of the representative point of the vehicle 1. Also, the vehicle system center of gravity of the entirety corresponds to the center of gravity of the entirety in the present invention.

Before processing of the respective function units of the first control processing unit 24 is described specifically, facts that become the base of the processing will be described. The dynamic behavior of the vehicle system center of gravity of the entirety (more specifically, the behavior as viewed in the Y-axis direction and the behavior as viewed in the X-axis direction) is approximately expressed by the behavior of an inverted pendulum model as shown in FIG. 5. The algorithm of the processing of the first control processing unit 24 is constructed on the basis of this behavior.

Also, including the reference signs in FIG. 5, in the description below, the suffix "_x" means the reference sign of the variables and the like as viewed from the Y-axis direction, and the suffix "_y" means the reference sign of the variables and the like as viewed from the X-axis direction. Further, in FIG. 5, in order to illustrate both of the inverted pendulum model as viewed from the Y-axis direction and the inverted pendulum model as viewed from the X-axis direction, the reference signs of the variables as viewed from the Y-axis direction is not in parentheses, and the reference signs of the variables as viewed from the X-axis direction is in parentheses.

The inverted pendulum model expressing the behavior of the vehicle system center of gravity of the entirety as viewed from the Y-axis direction includes an imaginary wheel 61_x having the rotation axis parallel to the Y-axis direction and rollable on the floor surface (hereinafter referred to as the imaginary wheel 61_x), a rod 62_x extended from the rotation center of the imaginary wheel 61_x and swingable around the rotation axis of the imaginary wheel 61_x (in the direction around Y-axis), and a mass point Ga_x connected to a reference Ps_x that is the distal end (upper end) of the rod 62_x.

In the inverted pendulum model, the motion of the mass point Ga_x is equivalent to the motion of the vehicle system center of gravity of the entirety as viewed from the Y-axis direction, and the inclination angle θb_x (the inclination angle in the direction around Y-axis) of the rod 62_x with respect to the vertical direction agrees to the inclination angle in the direction around Y-axis of the occupant riding section 5 (or the base 2). Also, the translational motion in the X-axis direction of the first moving motion unit 3 is equivalent to the translational motion in the X-axis direction caused by rolling of the imaginary wheel 61_x.

Further, the radius r_x of the imaginary wheel 61_x and the height h_x of the reference Ps_x and the mass point Ga_x from the floor surface are made preset values (constant values) that are set beforehand. Also, in other words, r_x is equivalent to the height of the center of tilting of the occupant riding section 5 (or the base 2) in the direction around -Y-axis from the floor surface. In the present embodiment, this r_x is equivalent to the distance between the axis of the annular core bodies 6 of the first moving motion unit 3 and the grounding surface.

In a similar manner, the inverted pendulum model expressing the behavior of the vehicle system center of gravity of the entirety as viewed from the X-axis direction includes an imaginary wheel 61_y having the rotation axis parallel to the X-axis direction and rollable on the floor surface (hereinafter referred to as the imaginary wheel 61_y), a rod 62_y extended from the rotation center of the imaginary wheel 61_y and swingable around the rotation axis of the imaginary wheel 61_y (in the direction around X-axis), and a mass point Ga_y connected to a reference Ps_y that is the distal end (upper end) of the rod 62_y.

In the inverted pendulum model, the motion of the mass point Ga_y is equivalent to the motion of the vehicle system center of gravity of the entirety as viewed from the X-axis direction, and the inclination angle θb_y (the inclination angle in the direction around X-axis) of the rod 62_y with respect to the vertical direction agrees to the inclination angle in the direction around X-axis of the occupant riding section 5 (or the base 2). Also, the translational motion in the Y-axis direction of the first moving motion unit 3 is equivalent to the translational motion in the Y-axis direction caused by rolling of the imaginary wheel 61_y.

Further, the radius r_y of the imaginary wheel 61_y and the height h_y of the reference Ps_y and the mass point Ga_y from the floor surface are made preset values (constant values) that are set beforehand. Also, in other words, r_y is equivalent to the height of the center of tilting of the occupant riding section 5 (or the base 2) in the direction around X-axis from the floor surface. In the present embodiment, this r_y is equivalent to the radius of the rollers 7 of the first moving motion unit 3. Also, the height h_y of the reference Ps_y and the mass point Ga_y as viewed from the X-axis direction from the floor surface is the same as the height h_x of the reference Ps_x and the mass point Ga_x as viewed from the Y-axis direction from the floor surface. Therefore, h_x=h_y=h is to be hereinafter noted.

A comment will be added on the positional relation between the reference Ps_x and the mass point Ga_x as viewed from the Y-axis direction. The position of the reference Ps_x is equivalent to the position of the vehicle system center of gravity of the entirety in a case where the occupant riding (sitting on) the occupant riding section 5 is assumed to be immobile with respect to the occupant riding section 5. Therefore, in this case, the position of the mass point Ga_x agrees to the position of the reference Ps_x. This is similar also with respect to the positional relation between the reference Ps_y and the mass point Ga_y as viewed from the X-axis direction.

However, in fact, an occupant riding on the occupant riding section 5 moves the upper body and the like thereof with respect to the occupant riding section 5 (or the base 2), and thereby the position in the X-axis direction and the position in the Y-axis direction of the actual vehicle system center of gravity of the entirety come to be shifted to the lateral direction respectively from the positions of the reference Ps_x, Ps_y in general. Therefore, in FIG. 5, the positions of the mass points Ga_x, Ga_y are illustrated in a state shifted respectively from the positions of the reference Ps_x, Ps_y.

The behavior of the vehicle system center of gravity of the entirety expressed by the inverted pendulum model as described above is expressed by expressions (1a), (1b), (2a), (2b) below. In this case, the expressions (1a), (1b) express the behavior as viewed in the Y-axis direction, and the expressions (2a), (2b) express the behavior as viewed in the X-axis direction.

$$Vb\_x = Vw1\_x + h\_x \cdot \omega b\_x \tag{1a}$$

$$dVb\_x/dt = (g/h) \cdot (\theta b\_x \cdot (h - r\_x) + Ofst\_x) + \omega z \cdot Vb\_y \tag{1b}$$

$$Vb\_y = Vw1\_y + h\_y \cdot \omega b\_y \tag{2a}$$

$$dVb\_y/dt = (g/h) \cdot (\theta b\_y \cdot (h - r\_y) + Ofst\_y) - \omega z \cdot Vb\_x \tag{2b}$$

Here, Vb_x is the speed (translational speed) in the X-axis direction of the vehicle system center of gravity of the entirety, Vw1_x is the moving speed (translational speed) in the X-axis direction of the imaginary wheel 61_x, θb_x is the inclination angle in the direction around Y-axis of the occupant riding section 5 (or the base 2), ωb_x is the temporal change rate of θb_x (=dθb_x/dt), Ofst_x is the shift amount in the X-axis direction of the position in the X-axis direction of the vehicle system center of gravity of the entirety (the position in the X-axis direction of the mass point Ga_x) from the position of the reference Ps_x, Vb_y is the speed (translational speed) in the Y-axis direction of the vehicle system center of gravity of the entirety, Vw1_y is the moving speed (translational speed) in the Y-axis direction of the imaginary wheel 61_y, θb_y is the inclination angle in the X-axis direction of the occupant riding section 5 (or the base 2), ωb_y is the temporal change rate of θb_y (=dθb_y/dt), and Ofst_y is the shift amount in the Y-axis direction of the position in the Y-axis direction of the vehicle system center of gravity of the entirety (the position in the Y-axis direction of the mass point Ga_y) from the position of the reference Ps_y. Also, ωz is the yaw rate (the angular velocity in the direction around the yaw axis) when the vehicle 1 turns, and g is the gravitational acceleration constant. Further, the positive direction of θb_x, ωb_x is the direction that the vehicle system center of gravity of the entirety inclines to the positive direction of X-axis (forward), and the positive direction of θb_y, ωb_y is the direction that the vehicle system center of gravity of the entirety inclines to the positive direction of Y-axis (leftward). Furthermore, the positive direction of ωz is the counterclockwise direction when the vehicle 1 is viewed from above.

Also, Vb_x, Vb_y agree to the moving speed in the X-axis direction of the reference Ps_x and the moving speed in the Y-axis direction of the reference Ps_y, respectively.

The second term of the right side of the expression (1a) (=h·ωb_x) is the translational speed component in the X-axis direction of the reference Ps_x generated by tilting of the occupant riding section 5 in the direction around Y-axis, and the second term of the right side of the expression (2a) (=h·ωb_y) is the translational speed component in the Y-axis direction of the reference Ps_y generated by tilting of the occupant riding section 5 in the direction around -X-axis.

In addition, more specifically, Vw1_x in the expression (1a) is the relative circumferential speed of the imaginary wheel 61_x with respect to the rod 62_x (in other words, with respect to the occupant riding section 5 or the base 2). Therefore, in Vw1_x, in addition to the moving speed in the X-axis direction of the grounding point of the imaginary wheel 61_x to the floor surface (the moving speed in the X-axis direction of the grounding point of the first moving motion unit 3 to the floor surface), a velocity component accompanying tilting of the rod 62_x (=r_x·ωb_x) is included. This fact is similar to Vw1_y in the expression (2a) also.

Also, the first term of the right side of the expression (1b) is the acceleration component in the X-axis direction generated in the vehicle system center of gravity of the entirety by the component in the X-axis direction (F_x in FIG. 5) of the floor reaction force (F in FIG. 5) applied to the grounding part of the imaginary wheel 61_x according to the shift amount (=θb_x·(h−r_x)+Ofst_x) of the position in the X-axis direction of the vehicle system center of gravity of the entirety (the position in the X-axis direction of the mass point Ga_x) from the upper position in the vertical direction of the grounding part of the imaginary wheel 61_x (the grounding part of the first moving motion unit 3 as viewed in the Y-axis direction), and the second term of the right side of the expression (1b) is the acceleration component in the X-axis direction generated by the centrifugal force applied to the vehicle 1 in turning at the yaw rate of ωz.

Similarly, the first term of the right side of the expression (2b) is the acceleration component in the Y-axis direction generated in the vehicle system center of gravity of the entirety by the component in the Y-axis direction (F_y in FIG. 5) of the floor reaction force (F in FIG. 5) applied to the grounding part of the imaginary wheel 61_y according to the shift amount (=θb_y·(h−r_y)+Ofst_y) of the position in the Y-axis direction of the vehicle system center of gravity of the entirety (the position in the Y-axis direction of the mass point Ga_y) from the upper position in the vertical direction of the grounding part of the imaginary wheel 61_y (the grounding part of the first moving motion unit 3 as viewed in the X-axis direction), and the second term of the right side of the expression (2b) is the acceleration component in the Y-axis direction generated by the centrifugal force applied to the vehicle 1 in turning at the yaw rate of ωz.

As described above, the behavior expressed by the expressions (1a), (1b) (the behavior as viewed in the X-axis direction) is expressed as shown in FIG. 6 when expressed by a block diagram. 1/s in the drawing expresses integral calculation.

Also, processing of the calculation unit marked with the reference sign A in FIG. 6 corresponds to the relation formula of the expression (1a), and processing of the calculation unit marked with the reference sign B corresponds to the relation formula of the expression (1b).

Further, h·θb_x in FIG. 6 approximately agrees to Diff_x shown in FIG. 5.

On the other hand, the block diagram that expresses the behavior expressed by the expressions (2a), (2b) (the behavior as viewed in the Y-axis direction) is obtained by substituting "_y" for the suffixes "_x" in FIG. 6 and substituting "−" for the marks "+" of the acceleration component (the acceleration component generated by the centrifugal force) on the lower side in the drawing that is one of the inputs to the adder marked with the reference sign C.

In the present embodiment, as described above, the algorithm of processing of the first control processing unit 24 is constructed based on a behavior model of the vehicle system center of gravity of the entirety (inverted pendulum model) that takes the shift amount of the vehicle system center of gravity of the entirety from the references Ps_x, Ps_y and the centrifugal force into consideration.

On the premise of the above, processing of the first control processing unit 24 will be described more specifically. Also, in the description below, a set of a value of a variable in relation with the behavior as viewed from the Y-axis direction and a value of a variable in relation with the behavior as viewed from the X-axis direction may be expressed adding the suffix "_xy".

Reference is made to FIG. 4. At each calculation processing period of the control device 21, the first control processing unit 24 executes processing of the operation command conversion unit 31 and processing of the center of gravity speed estimation unit 33 first.

The operation command conversion unit 31 determines a basic speed command Vjs_xy that is a basic command value of the moving speed (translational speed) of the first moving motion unit 3 according to an advancing/retreating command given by the joy stick 12 (an operation signal showing the swing amount in the X-axis direction of the joy stick 12 and the direction of the swing thereof) or a transverse moving command (an operation signal showing the swing amount in the Y-axis direction of the joy stick 12 and the direction of the swing thereof).

In this case, out of the basic speed command Vjs_xy, the basic speed command Vjs_x in the X-axis direction is determined according to the advancing/retreating command. More specifically, when the swing amount of the joy stick 12 shown by the advancing/retreating command is a swing amount toward the front, the basic speed command Vjs_x in the X-axis direction is made the speed command for the advancing direction of the vehicle 1, and, when the swing amount of the joy stick 12 is a swing amount toward the rear, the basic speed command Vjs_x in the X-axis direction is made the speed command for the retreating direction of the vehicle 1. Also, in this case, the magnitude of the basic speed command Vjs_x in the X-axis direction is determined so as to increase in the range of a predetermined upper limit value or below as the swing amount of the joy stick 12 to the front side or the rear side increases.

Further, a predetermined range where the swing amount of the joy stick 12 to the front side or the rear side becomes minute enough is made a dead zone, and it may be configured that the basic speed command Vjs_x in the X-axis direction is set to zero for the swing amount within the dead zone.

Also, out of the basic speed command Vjs_xy, the basic speed command Vjs_y in the Y-axis direction is determined according to the transverse moving command. More specifically, when the swing amount of the joy stick 12 shown by the transverse moving command is a swing amount toward the right, the basic speed command Vjs_y in the Y-axis direction is made the speed command toward the right of the vehicle 1, and, when the swing amount of the joy stick 12 is a swing amount toward the left side, the basic speed command Vjs_y in the Y-axis direction is made the speed command toward the left of the vehicle 1. In this case, the magnitude of the basic speed command Vjs_y in the Y-axis direction is determined so as to increase in the range of a predetermined upper limit value or below as the swing amount of the joy stick 12 toward the right or toward the left increases.

Further, with respect to the magnitude of the basic speed command Vjs_y, a predetermined range where the swing amount of the joy stick 12 toward the right or toward the left becomes minute enough is made a dead zone, and it may be configured that the basic speed command Vjs_y in the Y-axis direction is set to zero for the swing amount within the dead zone.

Also, when the joy stick 12 is operated in both of the front/rear direction (X-axis direction) and the right/left direction (Y-axis direction), the magnitude of the basic speed command Vjs_y in the Y-axis direction may be changed according to the swing amount of the joy stick 12 in the front/rear direction or the basic speed command Vjs_x in the X-axis direction.

The center of gravity speed estimation unit 33 calculates an estimate value Vb_estm1_xy of the speed of the vehicle system center of gravity of the entirety based on a geometric (kinematic) relation formula expressed by the expressions (1a), (2a) in the inverted pendulum model.

More specifically, as shown in the block diagram of FIG. 4, the estimate value Vb_estm1_xy of the speed of the vehicle system center of gravity of the entirety is calculated by adding a value of the actual translational speed Vw1_act_xy of the first moving motion unit 3 and a value obtained by multiplying the actual temporal change rate ωb_act_xy of the inclination angle θb_xy (inclination angular velocity) of the occupant riding section 5 by the height h of the vehicle system center of gravity of the entirety.

That is, the estimate value Vb_estm1_x of the speed in the X-axis direction and the estimate value Vb_estm1_y of the speed in the Y-axis direction of the vehicle system center of gravity of the entirety are calculated respectively by expressions (3a), (3b) below.

$$Vb\_estm1\_x = Vw1\_act\_x + h \cdot \omega b\_act\_x \quad (3a)$$

$$Vb\_estm1\_y = Vw1\_act\_y + h \cdot \omega b\_act\_y \quad (3b)$$

However, the temporal change rate of the shift amount Ofst_xy of the position of the vehicle system center of gravity of the entirety from the position of the reference Ps_xy (hereinafter referred to as a center of gravity shift amount Ofst_xy) was assumed to be small enough compared to Vb_estm1_xy and negligible.

In this case, for the values of Vw1_act_x, Vw1_act_y in the calculation above, in the present embodiment, target values Vw1_cmd_x, Vw1_cmd_y (values of the last time) of the moving speed of the first moving motion unit 3 determined by the attitude control calculation unit 34 at the last calculation processing period are used.

However, it may be configured for example that each rotational speed of the electric motors 8a, 8b is detected by a rotational speed sensor such as a rotary encoder and the like and newest values of Vw1_act_x, Vw1_act_y estimated from these estimate values (in other words, newest values of the measured values of Vw1_act_x, Vw1_act_y) are used for calculation of the expressions (3a), (3b).

Also, for the values of ωb_act_x, ωb_act_y, in the present embodiment, newest values of the temporal change rate of the measured value of the inclination angle θb of the occupant riding section 5 based on the detection signal of the inclination sensor 22 (in other words, newest values of the measured values of ωb_act_x, ωb_act_y) are used.

Complementarily, the expressions (3a), (3b) are expressions same as the expressions (Ax), (Ay), respectively.

The first control processing unit 24 executes processing of the operation command conversion unit 31 and the center of gravity speed estimation unit 33 as described above, thereafter executes processing of the center of gravity shift estimation unit 35a shown in FIG. 4, and thereby determines a center of gravity shift amount estimate value Ofst_estm_xy that is the estimate value of the center of gravity shift amount Ofst_xy. Also, the center of gravity shift amount Ofst_xy corresponds to the center of gravity of the entirety moving amount in the present invention.

Figure 7:
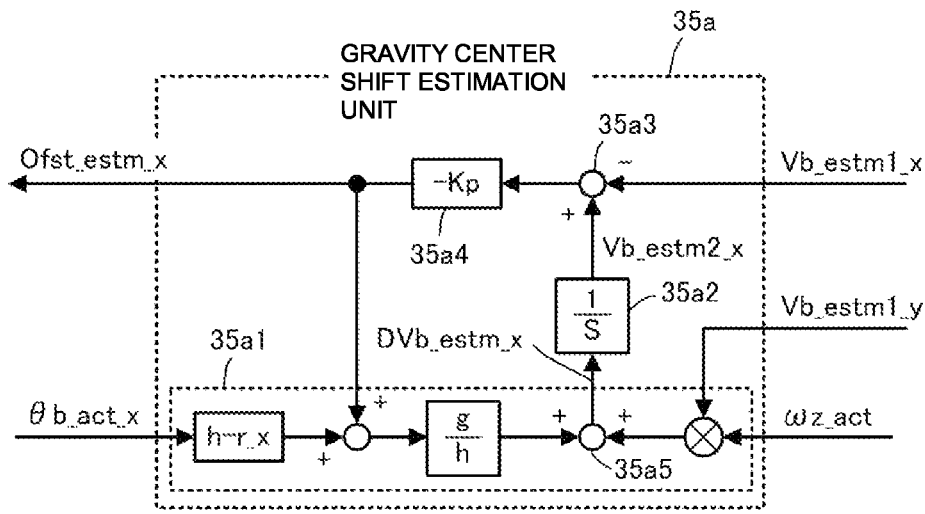
FIG. 7 is a block diagram showing processing of the center of gravity shift estimation unit shown in FIG. 4.

Processing of this center of gravity shift estimation unit 35a is processing shown by the block diagram of FIG. 7. Also, FIG. 7 representatively expresses determination processing of the center of gravity shift amount estimate value Ofst_estm_x in the X-axis direction out of the center of gravity shift amount estimate value Ofst_estm_xy. Further, in the description below, the estimate values Vb_estm1_x, Vb_estm1_y of the speed of the vehicle system center of gravity of the entirety calculated by the center of gravity speed estimation unit 33 may be referred to as the first estimate values Vb_estm1_x, Vb_estm1_y, respectively.

Processing of FIG. 7 will be described more specifically. The center of gravity shift estimation unit 35a calculates the estimate value DVb_estm_x of the translational acceleration in the X-axis direction of the vehicle system center of gravity of the entirety by executing calculation processing of the right side of the expression (1b) by a calculation unit 35a1 using the measured value (newest value) of the actual inclination angle θb_act_x of the occupant riding section 5 in the direction around Y-axis obtained from the detection signal of the inclination sensor 22, the measured value (newest value) of the actual Yaw rate ωz_act of the vehicle 1 obtained from the detection signal of the yaw rate sensor 23, the first estimate value Vb_estm1_y (newest value) of the speed of the vehicle system center of gravity of the entirety in the Y-axis direction calculated by the center of gravity speed estimation unit 33, and the center of gravity shift amount estimate value Ofst_estm_x (the value of the last time) in the X-axis direction determined at the calculation processing period of the last time.

Also the center of gravity shift estimation unit 35a calculates the second estimate value Vb_estm2_x of the speed of the vehicle system center of gravity of the entirety in the X axis direction by executing processing of integrating the estimate value DVb_estm_x of the translational acceleration in the X-axis direction of the vehicle system center of gravity of the entirety by a calculation unit 35a2.

Next, the center of gravity shift estimation unit 35a executes processing of calculating the deviation of the second estimate value Vb_estm2_x (newest value) of the speed of the vehicle system center of gravity of the entirety in the X-axis direction and the first estimate value Vb_estm1_x (the newest value) by a calculation unit 35a3.

Further, the center of gravity shift estimation unit 35a determines the newest value of the center of gravity shift amount estimate value Ofst_estm_x in the X-axis direction by executing processing of multiplying this deviation by a predetermined gain (−Kp) by a calculation unit 35a4.

Determining processing of the center of gravity shift amount estimate value Ofst_estm_y in the Y-axis direction is also executed similarly to the above. More specifically, the block diagram that shows this determining processing is obtained by replacing the suffixes "_x" and "_y" in FIG. 7 with each other and substituting "−" for the marks "+" of the acceleration component (the acceleration component generated by the centrifugal force) on the right side in the drawing that is one of the inputs to an adder 35a5.

By such processing of the center of gravity shift estimation unit 35a, Ofst_estm_xy can be determined so as to converge to an actual value by determining the center of gravity shift amount estimate value Ofst_estm_xy while updating it one by one.

Next, the first control processing unit 24 calculates the center of gravity shift effect amount Vofs_xy by executing processing of a center of gravity shift effect amount calculation unit 35b shown in FIG. 4.

The center of gravity shift effect amount Vofs_xy expresses the shift of the actual center of gravity speed with respect to the target speed of the vehicle system center of gravity of the entirety when feedback-control is executed in the attitude control calculation unit 34 described below without taking that the position of the vehicle system center of gravity of the entirety shifts from the position of the reference Ps_xy in the inverted pendulum model into consideration.

More specifically, this center of gravity shift effect amount calculation unit 35b calculates the center of gravity shift effect amount Vofs_xy by multiplying each component of the newly determined center of gravity shift amount estimate value Ofst_estm_xy by a value of (Kth_xy/(h−r_xy))/Kvb_xy.

Also, Kth_xy is a gain value for determining a manipulated variable component that functions so as to bring the inclination angle of the occupant riding section 5 close to zero (target inclination angle) in processing of the attitude control calculation unit 34 described below. Further, Kvb_xy is a gain value for determining a manipulated variable component that functions so as to bring the deviation of the target speed Vb_cmd_xy of the vehicle system center of gravity of the entirety and Vb_estm1_xy in the first estimate value of the speed of the vehicle system center of gravity of the entirety close to zero in processing of the attitude control calculation unit 34 described below.

Next, the first control processing unit 24 calculates a post-restriction center of gravity target speed Vb_cmd_xy based on the basic speed command Vjs_xy determined by the operation command conversion unit 31 and the center of gravity shift effect amount Vofs_xy determined by the center of gravity shift effect amount calculation unit 35b by executing processing of the center of gravity target speed determination unit 32 shown in FIG. 4.

First, the center of gravity target speed determination unit 32 executes processing of a processing unit 32c shown in FIG. 4. This processing unit 32c determines a target center of gravity speed adding amount Vb_cmd_by_ofs_xy as a component according to the shift of the center of gravity out of the target value of the speed of the vehicle system center of gravity of the entirety by executing dead zone processing and limiting processing in relation with the value of the center of gravity shift effect amount Vofs_xy.

More specifically, in the present embodiment, when the magnitude of the center of gravity shift effect amount Vofs_xy in the X-axis direction is a value within the dead zone that is a predetermined range in the vicinity of zero (a value comparatively near to zero), the center of gravity target speed determination unit 32 makes the target center of gravity speed adding amount Vb_cmd_by_ofs_xy in the X-axis direction zero.

Also, when the magnitude of the center of gravity shift effect amount Vofs_x in the X-axis direction is a value deviated from the dead zone, the center of gravity target speed determination unit 32 determines the target center of gravity speed adding amount Vb_cmd_by_ofs_x in the X-axis direction to be of a polarity same as that of Vofs_x and so that the magnitude thereof increases as the magnitude of Vofs_x increases. However, the value of the target center of gravity speed adding amount Vb_cmd_by_ofs_x is restricted to the range between predetermined upper limit value (>0) and lower limit value (≤0).

The determining process of the target center of gravity speed adding amount Vb_cmd_by_ofs_y in the Y-axis direction is also similar to the above.

Next, the center of gravity target speed determination unit 32 executes processing for determining the target speed V1_xy that is obtained by adding each component of the target center of gravity speed adding amount Vb_cmd_by_ofs_xy to each component of the basic speed command Vjs_xy which is determined by the operation command conversion unit 31 by a processing unit 32d shown in FIG. 4. More specifically, V1_xy (a set of V1_x and V1_y) is determined by processing of V1_x=Vjs_x+Vb_cmd_by_ofs_x, V1_y=Vjs_y+Vb_cmd_by_ofs_y.

Further, the center of gravity target speed determination unit 32 executes processing of a processing unit 32e. This processing unit 32e executes limiting processing for determining the post-restriction center of gravity target speed Vb_cmd_xy (a set of Vb_cmd_x and Vb_cmd_y) as the target speed of the vehicle system center of gravity of the entirety obtained by restricting combination of the target speed V1_x and V1_y in order that each rotational speed of the electric motor 8a, 8b as the actuator device 8 of the first moving motion unit 3 does not deviate from a predetermined allowable range.

In this case, when a set of the target speeds V1_x and V1_y obtained by the processing unit 32d exists within a predetermined region on a coordination system with the value of the target speed V1_x on the axis of ordinates and with the value of the target speed V1_y on the axis of abscissas (the region of the octagonal shape for example), the target speed V1_xy is determined as the post-restriction center of gravity target speed Vb_cmd_xy as it is.

Also when a set of the target speeds V1_x and V1_y obtained by the processing unit 32d deviates from the predetermined region on the coordination system, one restricted to a set on the boundary of the predetermined region is determined as the post-restriction center of gravity target speed Vb_cmd_xy.

As described above, because the center of gravity target speed Vb_cmd_xy is determined based on the basic speed command Vjs_xy and the center of gravity shift effect amount Vofs_xy (or the center of gravity shift amount), the occupant can steer the vehicle 1 by operation of the controller (operation of the joy stick 12) and by change of the attitude of the body of the occupant (movement of the body weight).

After executing processing of the center of gravity target speed determination unit 32 as described above, next, the first control processing unit 24 executes processing of the attitude control calculation unit 34. The attitude control calculation unit 34 determines the first target speed Vw1_cmd_xy that is the target value of the moving speed (translational speed) of the first moving motion unit 3 by processing shown in the block diagram of FIG. 4.

More specifically, first, the attitude control calculation unit 34 determines the target speed after center of gravity shift compensation Vb_cmpn_cmd_xy (newest value) by executing processing of reducing each component of the center of gravity shift effect amount Vofs_xy by a calculation unit 34b from each component of the post-restriction center of gravity target speed Vb_cmd_xy.

Next, by executing processing of a center of gravity adjustment unit 34c, the attitude control calculation unit 34 calculates an inclination correction amount θb_cmpn_xy that is the correction amount of the inclination angle θb of the occupant riding section 5 as a center of gravity manipulated variable for adjusting the position of the vehicle system center of gravity of the entirety.

Figure 8:
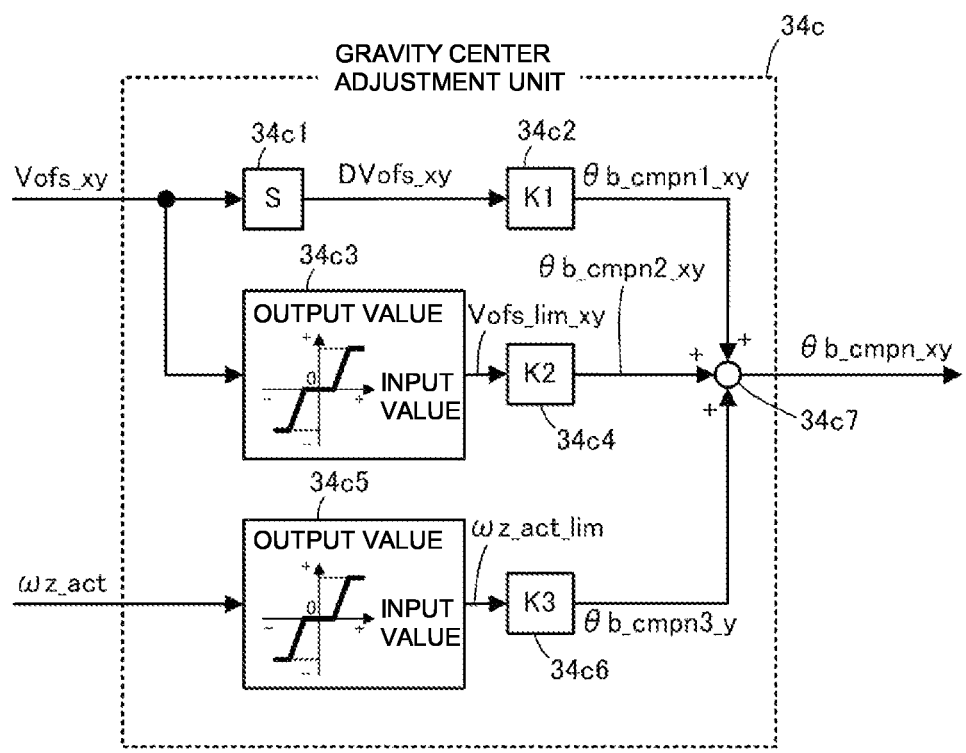
FIG. 8 is a block diagram showing processing of the center of gravity adjustment unit shown in FIG. 4.

In this case, the center of gravity adjustment unit 34c calculates the inclination correction amount θb_cmpn_xy by processing shown by the block diagram of FIG. 8.

More specifically, first, the center of gravity adjustment unit 34c calculates a first correction amount component θb_cmpn1_xy according to the temporal change rate (differential value) of the center of gravity shift effect amount Vofs_xy calculated by the center of gravity shift effect amount calculation unit 35b, a second correction amount component θb_cmpn2_xy according to the center of gravity shift effect amount Vofs_xy, and a third correction amount component θb_cmpn3_y according to the measured value of the actual yaw rate ωz_act of the vehicle 1 obtained from the detection signal of the yaw rate sensor 23.

In this case, a component θb_cmpn1_y in the direction around Y-axis out of the first correction amount component θb_cmpn1_xy is calculated by multiplying a differential value DVofs_x (newest value) of Vofs_x calculated by a processing unit 34c1 from a center of gravity shift effect amount Vofs_x in the X-axis direction calculated consecutively by the center of gravity shift effect amount calculation unit 35b by a gain K1 of a predetermined value by a processing unit 34c2. A component θb_cmpn1_y in the direction around X-axis out of the first correction amount component θb_cmpn1_xy is also calculated similarly to the above.

Also, a component θb_cmpn2_x in the direction around Y-axis out of the second correction amount component θb_cmpn2_xy is calculated by multiplying a value Vofs_lim_x that is obtained by subjecting a center of gravity shift effect amount Vofs_x (newest value) in the X-axis direction calculated consecutively by the center of gravity shift effect amount calculation unit 35b to dead zone processing and limiting processing by a processing unit 34c3 by a gain K2 of a predetermined value by a processing unit 34c4.

In the processing unit 34c4, when the magnitude of the center of gravity shift effect amount Vofs_x in the X-axis direction is a value within a dead zone that is a predetermined range in the vicinity of zero (a value comparatively close to zero), Vofs_lim_x is made zero.

Also, when the magnitude of the center of gravity shift effect amount Vofs_x in the X-axis direction is a value that deviates from within a dead zone, Vofs_lim_x is determined so as to have a polarity same as that of Vofs_x and so that the magnitude thereof increases accompanying increase of the magnitude of Vofs_x. However, the value of Vofs_lim_x is limited to within a range between predetermined upper limit value (>0) and lower limit value (<0).

A component θb_cmpn2_y in the direction around X-axis out of the second correction amount component θb_cmpn2_xy is also calculated similarly to the above.

Also, a third correction amount component θb_cmpn3_y is a component in the direction around X-axis, and, in the present embodiment, a third correction amount component θb_cmpn3_x in the direction around Y-axis is made zero. Further, the third correction amount component θb_cmpn3_y in the direction around X-axis is calculated by multiplying a value ωz_act_lim that is obtained by subjecting the measured value (newest value) of the actual yaw rate ωz_act of the vehicle 1 to dead zone processing and limiting processing by a processing unit 34c5 by a gain K3 of a predetermined amount by a processing unit 34c6.

In processing of the processing unit 34c5, when the magnitude of the measured value of the yaw rate ωz_act is a value within a dead zone that is a predetermined range in the vicinity of zero (a value comparatively close to zero), ωz_act_lim is made zero.

Also, when the magnitude of the measured value of the yaw rate ωz_act is a value that deviates from within a dead zone, ωz_act_lim is determined so as to have a polarity same as that of ωz_act and so that the magnitude thereof increases accompanying increase of the magnitude of ωz_act. However, the value of ωz_act_lim is limited to within a range between predetermined upper limit value (>0) and lower limit value (<0).

Also, processing of the processing unit 34c6 may be included in processing of the processing unit 34c5.

The center of gravity adjustment unit 34c calculates an inclination correction amount θb_cmpn_xy by adding the first correction amount component θb_cmpn1_xy, the second correction amount component θb_cmpn2_xy, and the third correction amount component θb_cmpn3_y calculated as described above by a processing unit 34c7.

Complementarily, the center of gravity shift effect amount Vofs_xy is proportionate to the center of gravity shift amount estimate value Ofst_estm_xy. Therefore, in the present embodiment, the first correction amount component θb_cmpn1_xy comes to be determined according to the temporal change rate of the center of gravity shift amount estimate value Ofst_estm_xy as a result. Similarly, the second correction amount component θb_cmpn2_xy comes to be determined according to the center of gravity shift amount estimate value Ofst_estm_xy as a result. However, the first correction amount component θb_cmpn1_xy and the second correction amount component θb_cmpn2_xy may be determined using Ofst_estm_xy instead of Vofs_xy.

Also, processing of the processing units 34c2, 34c4, 34c6 may be included in processing of the processing unit 34c1, the processing unit 34c3, the processing unit 34c5, respectively.

Further, complementarily with respect to the polarity of the gains K1, K2, K3, the polarity of the gain K1 is set so that the polarity of the first correction amount components θb_cmpn1_x, θb_cmpn1_y becomes the opposite polarity of the polarity of the temporal change rate of the center of gravity shift amount estimate values Ofst_estm_x, Ofst_estm_y, respectively.

Similarly, the polarity of the gain K2 is set so that the polarity of the second correction amount component θb_cmpn2_x, θb_cmpn2_y becomes the opposite polarity of the polarity of the center of gravity shift amount estimate value Ofst_estm_x, Ofst_estm_y, respectively.

Also, the polarity of the gain K3 is set so that the polarity of the third correction amount component θb_cmpn3_y becomes a negative value when ωz_act is in the counterclockwise direction as viewed from the above and the polarity of the third correction amount component θb_cmpn3_y becomes a positive value when ωz_act is in the clockwise direction as viewed from the above.

Further, complementarily with respect to the corresponding relation between the present embodiment and the present invention, in the present embodiment, the center of gravity shift effect amount Vofs_xy (or the center of gravity shift amount estimate value Ofst_estm_xy), the temporal change rate (differential value) thereof, and the measured value of the yaw rate ωz_act correspond to the predetermined kind of state of the vehicle in the present invention. Therefore, the center of gravity shift effect amount calculation unit 35b (or the center of gravity shift estimation unit 35a), the yaw rate sensor 23, and the processing unit 34c1 correspond to the vehicle state detection unit in the present invention.

Returning to description of FIG. 4, next, the attitude control calculation unit 34 calculates the target translational acceleration DVw1_cmd_x in the X-axis direction and the target translational acceleration DVw1_cmd_y in the Y-axis direction out of the target translational acceleration DVw1_cmd_xy that is the target value of the translational acceleration of the grounding point of the first moving motion unit 3 by processing of the calculation unit 34b, the center of gravity adjustment unit 34c, and the calculation units excluding an integration calculation unit 34a that executes integration calculation by calculation of expressions (4a), (4b) below, respectively.

$$DVw1\_cmd\_x = Kvb\_x \cdot (Vb\_cmpn\_cmd\_x - Vb\_estm1\_x) - Kth\_x \cdot (\theta b\_act\_x + \theta b\_cmpn\_x) - Kw\_x \cdot \omega b\_act\_x \quad (4a)$$

$$DVw1\_cmd\_y = Kvb\_y \cdot (Vb\_cmpn\_cmd\_y - Vb\_estm1\_y) - Kth\_y \cdot (\theta b\_act\_y + \theta b\_cmpn\_y) - Kw\_y \cdot \omega b\_act\_y \quad (4b)$$

Kvb_xy, Kth_xy, Kw_xy in the expressions (4a), (4b) are predetermined gain values set beforehand.

Also, the first term of the right side of the expression (4a) is a feedback manipulated variable component according to the deviation of the target speed after center of gravity shift compensation Vb_cmpn_cmd_x (newest value) in the X-axis direction of the vehicle system center of gravity of the entirety and the first estimate value Vb_estm1_x (newest value), the second term is a feedback manipulated variable component according to a value obtained by correcting the measured value (newest value) of the actual inclination angle θb_act_x in the direction around Y-axis of the occupant riding section 5 by the inclination correction amount θb_cmpn_x (=θb_act_x+θb_cmpn_x), and the third term is a feedback manipulated variable component according to the measured value (newest value) of the actual inclination angular velocity ωb_act_x in the direction around Y-axis of the occupant riding section 5. Further, the target translational acceleration DVw1_cmd_x in the X-axis direction is calculated as a combined manipulated variable of these feedback manipulated variable components.

Similarly, the first term of the right side of the expression (4b) is a feedback manipulated variable component according to the deviation of the target speed after center of gravity shift compensation Vb_cmpn_cmd_y (newest value) in the Y-axis direction of the vehicle system center of gravity of the entirety and the first estimate value Vb_estm1_y (newest value), the second term is a feedback manipulated variable component according to a value obtained by correcting the measured value (newest value) of the actual inclination angle θb_act_y in the direction around X-axis of the occupant riding section 5 by the inclination correction amount θb_cmpn_y (=θb_act_y+θb_cmpn_y), and the third term is a feedback manipulated variable component according to the measured value (newest value) of the actual inclination angular velocity ωb_act_y in the direction around X-axis of the occupant riding section 5. Further, the target translational acceleration DVw1_cmd_y in the Y-axis direction is calculated as a combined manipulated variable of these feedback manipulated variable components.

Next, the attitude control calculation unit 34 determines the first target speed Vw1_cmd_xy (newest value) of the first moving motion unit 3 by integrating each component of the target translational acceleration DVw1_cmd_xy by the integration calculation unit 34a.

Also, the first control processing unit 24 controls the electric motors 8a, 8b as the actuator device 8 of the first moving motion unit 3 according to the first target speed Vw1_cmd_xy determined as described above. More specifically, the first control processing unit 24 determines the current command value of the each electric motor 8a, 8b by feedback control processing so that actual rotational speed (measured value) follows up the target value of the rotational speed of the each electric motor 8a, 8b decided by the first target speed Vw1_cmd_xy, and executes energization of the each electric motor 8a, 8b according to this current command value.

In a situation the center of gravity shift amount estimate value Ofst_estm_xy is constantly maintained at zero or a value close to zero (more specifically, a value of the dead zone in the processing unit 34c3 of FIG. 8) and the actual yaw rate ωz_act of the vehicle 1 is zero or a value close to zero (more specifically, a value of the dead zone in the processing unit 34c5 of FIG. 8) by processing described above, the inclination correction amount θb_cmpn_xy becomes zero.

In this situation, when the center of gravity target speed Vb_cmd_xy is constant, the target translational acceleration DVw1_cmd_xy and the first target speed Vw1_cmd_xy of the first moving motion unit 3 are determined consecutively with a state the actual moving speed (the first estimate value Vb_estm1_xy) of the vehicle system center of gravity of the entirety agrees to Vb_cmd_xy being made the convergence target in a state where the vehicle system center of gravity Ga exists just above the grounding point of the first moving motion unit 3 (in other words, a state where the vehicle system center of gravity exists on the action line Lg of the grounding load (the road surface reaction force in the vertical direction) applied to the first moving motion unit 3) as exemplified in FIG. 10(a).

In this case, at the time the vehicle 1 does not turn, the state where the vehicle system center of gravity exists just above the grounding point of the first moving motion unit 3 (the state where the vehicle system center of gravity exists on the action line Lg of the grounding load (the road surface reaction force in the vertical direction) applied to the first moving motion unit 3) is a state where the actual inclination angle θb_act_xy of the occupant riding section 5 becomes −Ofst_estm_xy/(h−r_xy). At the time the vehicle 1 does not turn, this state is a state corresponding to the balance state in the present invention. Complementarily, the balance state at the time the vehicle 1 turns is a dynamic balanced state considering the centrifugal force, and, in this state, the position of the vehicle system center of gravity of the entirety becomes a position shifted in the horizontal direction from the position on the action line Lg of the grounding load.

Also, in FIG. 10(a), Ofst_estm_xy=0 is achieved. Further, Gp, Gv in FIGS. 10(a) and 10(b) show the center of gravity of the occupant only, and the center of gravity of the vehicle 1 only, respectively.

On the other hand, when the temporal change rate of the center of gravity shift amount estimate value Ofst_estm_xy is not zero, or when the magnitude of Ofst_estm_xy becomes comparatively large (more specifically, when Ofst_estm_xy deviates from a dead zone in the processing unit 34c3 of FIG. 8), or when the magnitude of the actual yaw rate ωz_zct of the vehicle 1 becomes comparatively large (more specifically, when ωz_act deviates from a dead zone in the processing unit 34c5 of FIG. 8), the inclination correction amount θb_cmpn_xy becomes a value not zero.

In this situation, when the center of gravity target speed Vb_cmd_xy is constant, the target translational acceleration DVw1_cmd_xy and the first target speed Vw1_cmd_xy of the first moving motion unit 3 are determined consecutively with a state the actual moving speed (the first estimate value Vb_estm1_xy) of the vehicle system center of gravity of the entirety agrees to Vb_cmd_xy being made the convergence target in a state where the position of the vehicle system center of gravity of the entirety Ga is shifted to the lateral direction from the position of the balance state as exemplified in FIG. 10 (b) (the position just above the grounding point of the first moving motion unit 3 (on the action line Lg of the grounding load applied to the first moving motion unit 3) in the illustrated example).

In this case, the state where the position of the vehicle system center of gravity of the entirety Ga is shifted in the lateral direction from the position of the balance state (here, the position just above the grounding point of the first moving motion unit 3 (on the action line Lg of the grounding load applied to the first moving motion unit 3)) is, more specifically, a state where a value obtained by correcting the actual inclination angle θb_act_xy of the occupant riding section 5 by the inclination correction amount θb_cmpn_xy (=θb_act_xy+θb_cmpn_xy) agrees to −Ofst_estm_xy/(h−r_xy) (in other words, a state where the actual inclination angle θb_act_xy agrees to −(θb_cmpn_xy+Ofst_estm_xy/(h−r_xy))).

In addition, because Vb_cmpn_cmd_x=Vb_cmd_x−Vofs_x=Vb_cmd_x−(Kth_x/h−r_x)·(1/Kvb_x)·Ofst_estm_x and Vb_cmpn_cmd_y=Vb_cmd_y−Vofs_y=Vb_cmd_y·(Kth_y/h−r_y)·(1/Kvb_y)·Ofst_estm_y in the expressions (4a), (4b), the expressions (4a), (4b) can be rewritten to expressions (4a)', (4b)' below, respectively.

$$DVw1\_cmd\_x = Kvb\_x \cdot (Vb\_cmd\_x - Vb\_estm1\_x) - \quad (4a)'$$
$$Kth\_x \cdot (Ofst\_estm\_x/(h-r\_x) + \theta b\_cmpn\_x + \theta b\_act\_x) -$$
$$Kw\_x \cdot \omega b\_act\_x$$

$$DVw1\_cmd\_y = Kvb\_y \cdot (Vb\_cmd\_y - Vb\_estm1\_y) - \quad (4b)'$$
$$Kth\_y \cdot (Ofst\_estm\_y/(h-r\_y) + \theta b\_cmpn\_y + \theta b\_act\_y) -$$
$$Kw\_y \cdot \omega b\_act\_y$$

In this case, the second term of the right side of the expressions (4a)', (4b)' has the meaning as a feedback manipulated variable component for making the actual position of the vehicle system center of gravity of the entirety in the X-axis direction and the Y-axis direction converge to a position shifted from the position just above the grounding part of the first moving motion unit 3 in the X-axis direction and the Y-axis direction by θb_cmpn_x·(h−r_x), θb_cmpn_y(h−r_y), respectively. The feedback manipulated variable component has, in other words, the meaning as the feedback manipulated variable component for making the actual inclination angle θb_act_xy of the occupant riding section 5 converge to the target inclination angle (−(Ofst_estm_xy/(h−r_xy)+θb_cmpn_xy) in a state where the position of the vehicle system center of gravity of the entirety is shifted.

Above is the detail of processing of the first control processing unit 24 in the present embodiment.

Next, processing of the second control processing unit 25 will be described referring to FIG. 9. Roughly speaking on processing thereof, the second control processing unit 25 determines presence/absence of the request for turning the vehicle 1 (hereinafter referred to as a turning request) or the degree of the turning request based on the actual motion state in the Y-axis direction (the right/left direction of the occupant) of the representative point of the vehicle 1 such as the vehicle system center of gravity of the entirety or the first moving motion unit 3 or the motion state of the target, or the action state of the occupant in relation with the motion states.

In the present embodiment, as an indicator for determining presence/absence of the turning request or the degree of the turning request, the estimate value Vb_estm1_y of the moving speed in the Y-axis direction of the vehicle system center of gravity of the entirety calculated by the center of gravity speed estimation unit 33 is used. Also, because Vb_estm1_y agrees to the moving speed in the Y-axis direction of the reference Ps_y, it has the meaning as the observed value of the moving speed in the Y-axis direction of the representative point fixed with respect to the occupant riding section 5 (or the base 2).

Further, when it is determined that there is a turning request, in order to make the vehicle 1 turn, the second control processing unit 25 determines the second target speed Vw2_cmd_y in the Y-axis direction of the second moving motion unit 4 so as to be different from the first target speed Vw1_cmd_y in the Y-axis direction of the first moving motion unit 3.

Such processing of the second control processing unit 25 is executed specifically as described below. More specifically, with reference to FIG. 9, first, the second control processing unit 25 executes processing of a processing unit 41. To the processing unit 41, the estimate value Vb_estm1_y (newest value) of the moving speed in the Y-axis direction of the vehicle system center of gravity of the entirety calculated by the center of gravity speed estimation unit 33 is inputted. Also, the processing unit 41 determines the speed after dead zone processing Vw1a_y according to Vb_estm1_y.

When the occupant of the vehicle 1 intends to turn the vehicle 1 to the right or left, the occupant normally tries to shift the center of gravity of himself or herself to the right or left of the vehicle 1 by tilting the upper body of the occupant himself or herself to the right or left. At this time, the first target speed Vw1_cmd_y in the right/left direction of the first moving motion unit 3 determined by control processing of the first control processing unit 24 basically becomes the moving speed to the right or to the left.

However, even when the occupant does not intend to turn the vehicle 1, the center of gravity of the occupant himself or herself may possibly shifts to the right or left to some extent by drift of the upper body of the occupant.

Figure 9:
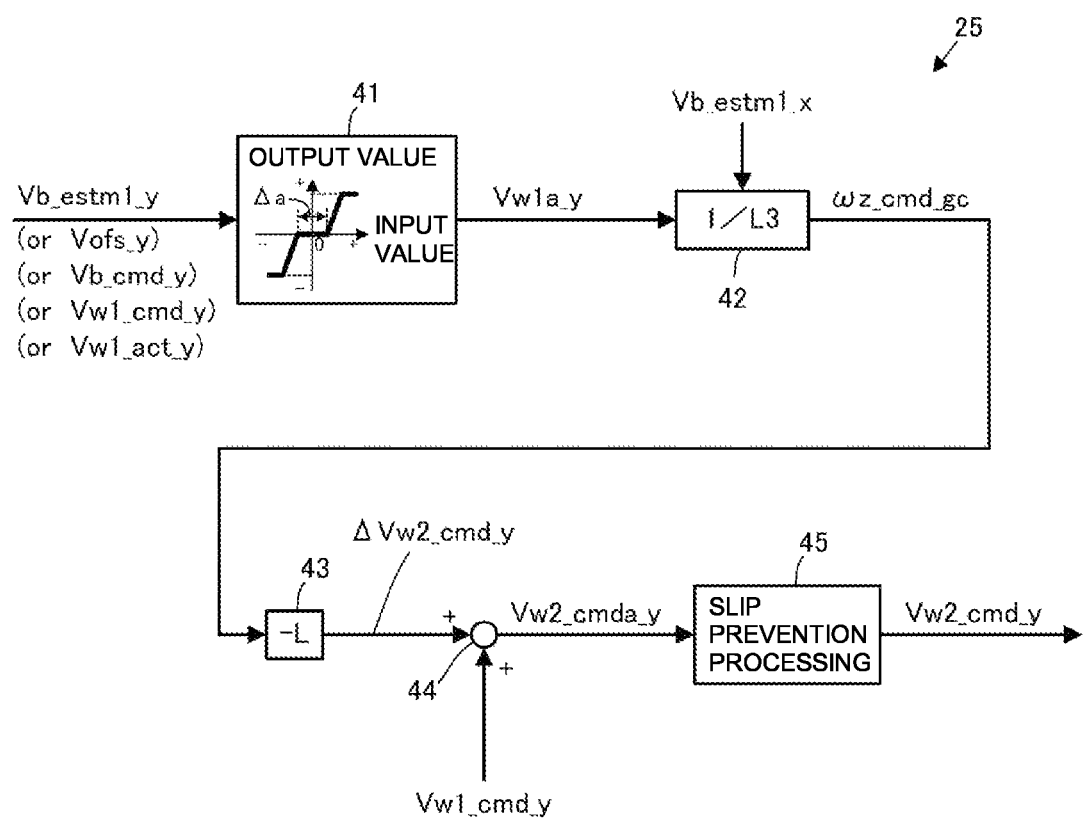
FIG. 9 is a block diagram showing processing of the second control processing unit shown in FIG. 3.

Therefore, by the characteristic of the graph shown in FIG. 9, the processing unit 41 determines the speed after dead zone processing Vw1a_y according to Vb_estm1_y. More specifically, when the absolute value of Vb_estm1_y is comparatively small and Vb_estm1_y is a value within a predetermined range Δa with zero taken in the center (when the absolute value of Vb_estm1_y is equal to or less than a predetermined value determined beforehand), the processing unit 41 deems that there is no turning request, and makes Vw1a_y zero.

Also, when the absolute value of Vb_estm1_y is comparatively large and Vb_estm1_y is a value out of the predetermined range Δa (when the absolute value of Vb_estm1_y is larger than the predetermined value determined beforehand), the processing unit 41 deems that there is a turning request, and sets Vw1a_y to a value that is not zero.

More specifically, the processing unit 41 determines Vw1a_y according to Vb_estm1_y so that the absolute value of Vw1a_y increases accompanying increase of the absolute value of Vb_estm1_y in the range of a predetermined upper limit value or less. In this case, the polarity (direction) of Vw1a_y is made same as that of Vb_estm1_y. As described below, in order to set the center of turning to a preferable position, the increase ratio of the absolute value of Vw1a_y with respect to increase of the absolute value of Vb_estm1_y is preferable to be 1. More specifically, in a region excluding the dead zone and the saturate region in the graph of FIG. 9, the inclination is preferable to be 1.

Also, in FIG. 9, the reference signs in parentheses on the input side of the processing unit 41 relate to the modifications described below.

Next, the second control processing unit 25 executes processing of a processing unit 42. This processing unit 42 determines the target turning angular velocity ωz_cmd_gc that is the target value of the turning angular velocity (the angular velocity in the direction around the yaw axis) of the vehicle 1 by dividing Vw1a_y by distance L3 in the X-axis direction between the grounding part of the first moving motion unit 3 and the center of turning. In this case, the processing unit 42 sets the distance L3 according to the estimate value Vb_estm1_x (newest value) of the actual moving speed in the X-axis direction of the vehicle system center of gravity of the entirety as the representative point of the vehicle 1.

More specifically, the center of turning means the center of rotation in the direction around the yaw axis of the entirety of the vehicle 1 as viewed on the coordinate system that translationally moves on the floor surface integrally with the first moving motion unit 3.

In the present embodiment, turning of the vehicle 1 is executed in the direction around the yaw axis with a point on the floor surface on the rear side of the grounding part of the first moving motion unit 3 (the rear side of the occupant riding on the occupant riding section 5) being the center of turning. Also, when Vb_estm1_x is zero, the distance L3 in the X-axis direction between the center of turning and the grounding part of the first moving motion unit 3 is set so that the center of turning comes to a position in the vicinity of the grounding part of the second moving motion unit 4. For example, L3 is set so as to agree or generally agree to the distance between the grounding part of the first moving motion unit 3 and the grounding part of the second moving motion unit 4.

Also, when Vb_estm1_x is positive which is the case of moving forward, L3 is set so that the center of turning approaches the grounding part side of the first moving motion unit 3 from the grounding part side of the second moving motion unit 4 (so that the position in the X-axis direction of the center of turning approaches the position just below the occupant riding on the occupant riding section 5 (the position where the occupant is projected to the floor surface)) as the magnitude (absolute value) of Vb_estm1_x increases. That is, L3 is set so as to reduce as the magnitude (absolute value) of Vb_estm1_x increases. However, L3 is restricted to a distance of a predetermined lower limit value (>0) or more.

Note that, when Vb_estm1_x is negative which is the case of moving rearward, L3 is preferable to be set to be the same as a value of a case where Vb_estm1_x is zero, or to increase as the magnitude (absolute value) of Vb_estm1_x increases.

The processing unit 42 determines the target turning angular velocity ωz_cmd_gc by dividing Vw1a_y by the distance L3 that is determined thus according to Vb_estm1_x. Also, ωz_cmd_gc is the angular velocity of the left turn (counterclockwise) when Vw1a_y is the leftward velocity, and is the angular velocity of the right turn (clockwise) when Vw1a_y is the rightward velocity.

Next, the second control processing unit 25 executes processing of a processing unit 43. The processing unit 43 calculates the relative moving speed ΔVw2_cmd_y in the Y-axis direction of the second moving motion unit 4 with respect to the first moving motion unit 3 in a case where the vehicle 1 turns at the target turning angular velocity ωz_cmd_gc by multiplying the target turning angular velocity ωz_cmd_gc determined by the processing unit 42 by a value (=−L) of (−1) times of a predetermined distance between the grounding part of the first moving motion unit 3 and the grounding part of the second moving motion unit 4.

In a case of ωz_cmd_gc=0 (in a case where there is no turning request), the relative moving speed ΔVw2_cmd_y in the Y-axis direction of the second moving motion unit 4 thus determined becomes zero. Also, ΔVw2_cmd_y is the rightward velocity when ωz_cmd_gc is the turning angular velocity of the left turn, and is the leftward velocity when ωz_cmd_gc is the turning angular velocity of the right turn. Therefore, ΔVw2_cmd_y of a case where there is a turning request is the velocity of the direction opposite to that of Vw1a_y or Vb_estm1_y.

Next, the second control processing unit 25 executes processing of a processing unit 44. This processing unit 44 determines the basic value Vw2_cmda_y (newest value) of the second target speed Vw2_cmd_y in the Y-axis direction of the second moving motion unit 4 by adding the relative moving speed ΔVw2_cmd_y in the Y-axis direction of the second moving motion unit 4 to the first target speed Vw1_cmd_y (newest value) in the Y-axis direction of the first moving motion unit 3 determined by the first control processing unit 24.

Next, the second control processing unit 25 executes processing of a processing unit 45. This processing unit 45 determines the second target speed Vw2_cmd_y in the Y-axis direction of the second moving motion unit 4 by executing slip preventing processing for preventing slip of the second moving motion unit 4.

In this case, when slip of the second moving motion unit 4 is anticipated to be liable to occur, for example, in the case where the absolute value of the basic value Vw2_cmda_y is excessively large, the processing unit 45 sets the second target speed Vw2_cmd_y in the Y-axis direction of the second moving motion unit 4 to a speed that is corrected from the basic value Vw2_cmda_y. Also, when slip of the second moving motion unit 4 is not anticipated to occur, the processing unit 45 determines the basic value Vw2_cmda_y as it is as the second target speed Vw2_cmd_y in the Y-axis direction of the second moving motion unit 4.

Further, when the friction force between the second moving motion unit 4 and the floor surface can be secured sufficiently, for example, in the case where the second moving motion unit 4 is pressed to the floor surface by a spring and the like, processing of the processing unit 45 may be omitted.

Also, the second control processing unit 25 controls the electric motor 17 as the actuator device of the second moving motion unit 4 according to the second target speed Vw2_cmd_y determined as described above. More specifically, the second control processing unit 25 determines the current command value of the electric motor 17 by feedback control processing so that the actual rotational speed (measured value) follows up the target value of the rotational speed of the electric motor 17 decided by the second target speed Vw2_cmd_y, and executes energization of the electric motor 17 according to this current command value.

Control processing of the second control processing unit 25 is executed as described above. Thus, the second target speed Vw2_cmd_y in the Y-axis direction of the second moving motion unit 4 is determined basically to a speed obtained by adding the relative moving speed ΔVw2_cmd_y to the first target speed Vw1_cmd_y (newest value) in the Y-axis direction of the first moving motion unit 3.

In this case, under the situation that the absolute value of the estimate value Vb_estm1_y of the moving speed in the Y-axis direction of the vehicle system center of gravity of the entirety is small enough and it is determined that there is no turning request, ΔVw2_cmd_y=0 is resulted, and therefore the second target speed Vw2_cmd_y in the Y-axis direction of the second moving motion unit 4 is basically determined so as to agree to the first target speed Vw1_cmd_y in the Y-axis direction of the first moving motion unit 3.

On the other hand, under the situation that the absolute value of the estimate value Vb_estm1_y of the moving speed in the Y-axis direction of the vehicle system center of gravity of the entirety is comparatively large and it is determined that there is a turning request, ΔVw2_cmd_y is determined to a velocity with the direction opposite to that of Vb_estm1_y. Therefore, the second target speed Vw2_cmd_y in the Y-axis direction of the second moving motion unit 4 is basically determined to be a velocity with the direction the same as that of the first target speed Vw1_cmd_y in the Y-axis direction of the first moving motion unit 3 and with a magnitude smaller than that of Vw1_cmd_y (a velocity of zero or near to zero), or is determined to be a velocity with the direction opposite to that of the first target speed Vw1_cmd_y in the Y-axis direction of the first moving motion unit 3.

In the vehicle 1 of the present embodiment described above, translational movement of the vehicle 1 in the X-axis direction can be executed according to the tilting in the front/rear direction (the X-axis direction) of the occupant riding section 5 (or the base 2) accompanying movement of the body of the occupant riding on the occupant riding section 5, or according to the advancing/retreating command outputted according to the swing operation in the front/rear direction of the joy stick 12.

Also, under such a situation wherein the movement in the right/left direction of the center of gravity of the occupant himself or herself riding on the occupant riding section 5 (relative movement with respect to the occupant riding section 5) is comparatively small and the estimate value Vb_estm1_y of the moving speed in the Y-axis direction of the vehicle system center of gravity of the entirety falls within a predetermined range Δa in the vicinity of zero, translational movement of the vehicle 1 the Y-axis direction can be executed according to minute tilting in the right/left direction (the Y-axis direction) of the occupant riding section 5 (or the base 2), or according to the transverse movement command outputted according to the swing operation in the right/left direction of the joy stick 12.

Further, combining these translational movements, translational movement of the vehicle 1 can be executed also in an optional direction oblique with respect to the X-axis direction and the Y-axis direction.

Also, when the estimate value Vb_estm1_y of the moving speed in the Y-axis direction of the vehicle system center of gravity of the entirety deviates from the predetermined range Δa in the vicinity of zero because the occupant riding on the occupant riding section 5 moves the center of gravity of the occupant himself or herself comparatively largely in the right/left direction, the second target speed Vw2_cmd_y in the Y-axis direction of the second moving motion unit 4 is determined to a speed shifted from the first target speed Vw1_cmd_y in the Y-axis direction of the second moving motion unit 4 by ΔVw2_cmd_y. Further, in this case, the second target speed Vw2_cmd_y is determined to such speed that makes the vehicle 1 turn around the center of turning on the rear side of the grounding part of the first moving motion unit 3.

Therefore, the occupant can turn the vehicle 1 only by moving the upper body so as to move the center of gravity of the occupant himself or herself in the right/left direction. Also, in this case, the vehicle 1 turns to the left when the occupant moves the center of gravity of the occupant himself or herself to the left, and the vehicle 1 turns to the right when the occupant moves the center of gravity of the occupant himself or herself to the right. Accordingly, the movement of the center of gravity of the occupant in the right/left direction and the turning direction of the vehicle 1 conform to each other.

Therefore, the occupant can easily turn the vehicle 1 by movement in the right/left direction of the upper body of the occupant himself or herself, and can easily master the steering operation for turning the vehicle 1.

Also, for example, when the vehicle 1 is to be turned (direction change) in a stop state of the vehicle 1 (the state in which movement of the first moving motion unit 3 and the second moving motion unit 4 almost stops), the first moving motion unit 3 that supports the weight of the occupant and the weight of the major part of the vehicle 1 comes to move in the right/left direction (the Y-axis direction), and therefore a large friction force can be prevented from applying to the first moving motion unit 3. Accordingly, turning (direction change) of the vehicle 1 can be executed smoothly.

Also, when the vehicle 1 is to be turned while the vehicle 1 is moved to the forward direction (the positive direction of X-axis), as the magnitude (absolute value) of the estimate value Vb_estm1_x of the moving speed in the X-axis direction of the vehicle system center of gravity of the entirety as a representative point of the vehicle 1 is larger, the distance L3 between the grounding part of the first moving motion unit 3 and the center of turning becomes smaller, and therefore the occupant can easily make the movement trajectory in turning of the vehicle 1 line with a desired trajectory.

Also, in the present embodiment, the center of gravity shift estimation unit 35a of the first control processing unit 24 estimates the center of gravity shift amount Ofst_xy of the vehicle system center of gravity of the entirety by processing shown in FIG. 7. Therefore, the center of gravity shift amount can be estimated accurately. Also, as described above, according to the estimate value Ofst_estm_xy of this center of gravity shift amount Ofst_xy, the target speed (post-restriction center of gravity target speed) Vb_cmd_xy of the vehicle system center of gravity of the entirety is determined. Therefore, the effect exerted to the behavior of the vehicle 1 by the center of gravity shift amount Ofst_xy can be properly compensated.

Further, in the present embodiment, when the occupant riding on the occupant riding section 5 moves the center of gravity of the occupant himself or herself in the front/rear direction or the right/left direction with respect to the occupant riding section 5 in order to execute turning motion, advancing acceleration and the like of the vehicle 1, the inclination correction amount θb_cmpn_xy becomes a value not zero. Also, in this situation, movement of the first moving motion unit 3 is controlled so as to achieve a state where the position of the vehicle system center of gravity of the entirety is shifted in the lateral direction from the position just above the grounding point of the first moving motion unit 3 (on the action line of the grounding load applied to the first moving motion unit 3) even when the center of gravity target speed Vb_cmd_xy is constant.

For example, at the time the vehicle 1 turns, moving control of the first moving motion unit 3 of the vehicle 1 is executed so that the vehicle system center of gravity of the entirety Ga is shifted from the position on the action line Lg of the grounding load applied to the first moving motion unit 3 to the center side of the turning radius (the right side facing the front of the vehicle 1 in FIG. 10(b)) as shown in FIG. 10(b).

Also, the direction in which the vehicle system center of gravity of the entirety shifts from the position on the action line Lg of the grounding load applied to the first moving motion unit 3 becomes the direction same as that of the center of gravity shift amount estimate value Ofst_estm_xy or the temporal change rate of the center of gravity shift amount estimate value Ofst_estm_xy, or the direction directed to the center of the turning radius in turning motion of the vehicle 1.

Because the position of the vehicle system center of gravity of the entirety shifts from the position on the action line Lg of the grounding load applied to the first moving motion unit 3 as described above, consistency of the moving behavior of the first moving motion unit 3 and the behavior of the vehicle system center of gravity of the entirety improves. Therefore, the occupant can physically sense effectively that movement of the occupant himself or herself is reflected to the moving behavior of the first moving motion unit 3.

Particularly, at the time of turning motion of the vehicle 1, the vehicle system center of gravity of the entirety can be shifted from the position of the balance state toward the center of the turning radius. Therefore, it becomes easy for the occupant to steer the vehicle 1, and the operation performance of the vehicle 1 improves.

Further, in the vehicle 1 of the present embodiment, the swing amount (the swing amount in the direction around Y-axis) of the second moving motion unit 4 with respect to the base 2 is mechanically restricted to within a predetermined range defined by the stoppers 16, 16, and therefore, in particular, the occupant riding section 5 can be prevented from tilting excessively to the rear side.

Next, the second embodiment and the third embodiment of the present invention will be described respectively referring to FIG. 11(a) and FIG. 11(b). Also, the second embodiment and the third embodiment are different from the first embodiment with respect to only a part of processing of the second control processing unit 25. Therefore, in the description of the second embodiment and the third embodiment, the description of items that are the same as those of the first embodiment will be omitted.

Also, in FIGS. 11(a) and 11(b), the reference signs in parentheses relate to the modifications described below.

Figure 11A:
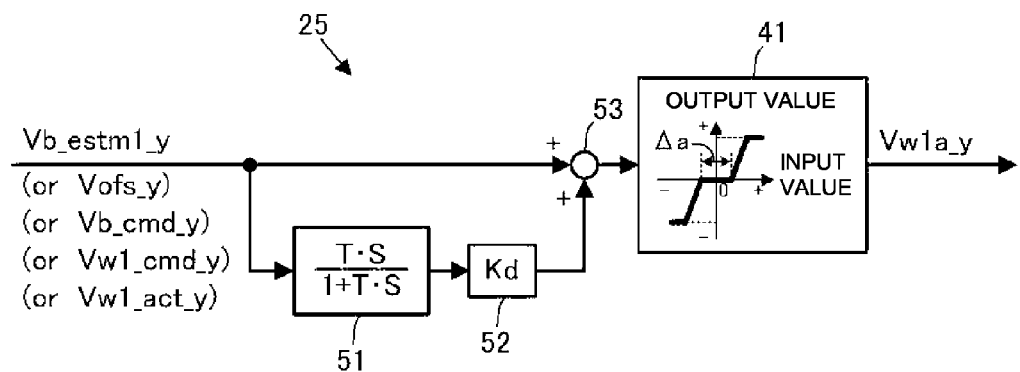
FIGS. 11(a) and 11(b) are block diagrams showing processing of an essential part of the second control processing unit in the second embodiment and the third embodiment of the present invention, respectively.

FIG. 11(a) shows processing in which the second control processing unit 25 determines Vw1a_y (the target value of the speed after dead zone processing) according to the estimate value Vb_estm1_y of the moving speed in the Y-axis direction of the vehicle system center of gravity of the entirety in the second embodiment.

In this second embodiment, the second control processing unit 25 includes a low-cut filter (pseudo-differentiation filter) 51 to which the estimate value Ybestm1_y of the moving speed in the Y-axis direction of the vehicle system center of gravity of the entirety is inputted. The second control processing unit 25 adds a value obtained by multiplying the output of the low-cut filter 51 (a value obtained by subjecting Vb_estm1_y to filtering processing of a low-cut characteristic) by the gain Kd of a predetermined value by a processing unit 52 to Vb_estm1_y by a calculation unit 53.

Also, the second control processing unit 25 inputs the output of the calculation unit 53 to the processing unit 41 same as that of the first embodiment instead of inputting Vb_estm1_y, executes processing of the processing unit 41 in a similar manner as done in the first embodiment, and thereby determines Vw1a_y. That is, Vw1a_y is equivalent to one obtained by passing Vb_estm1_y through a phase compensation circuit (filter).

The second embodiment is the same as the first embodiment with respect to the items other than those described above.

In such second embodiment, Vw1a_y and the target turning angular velocity ωz_cmd_gc are determined according to the phase compensation value of the estimate value Vb_estm1_y of the moving speed in the Y-axis direction of the vehicle system center of gravity of the entirety (the output of the calculation unit 53) and the output of the low-cut filter 51 which becomes one according to the temporal change rate thereof.

Therefore, the response of the turning behavior of the vehicle 1 can be improved with respect to movement in the Y-axis direction of the vehicle system center of gravity of the entirety accompanying movement of the upper body of the occupant.

Figure 11B:
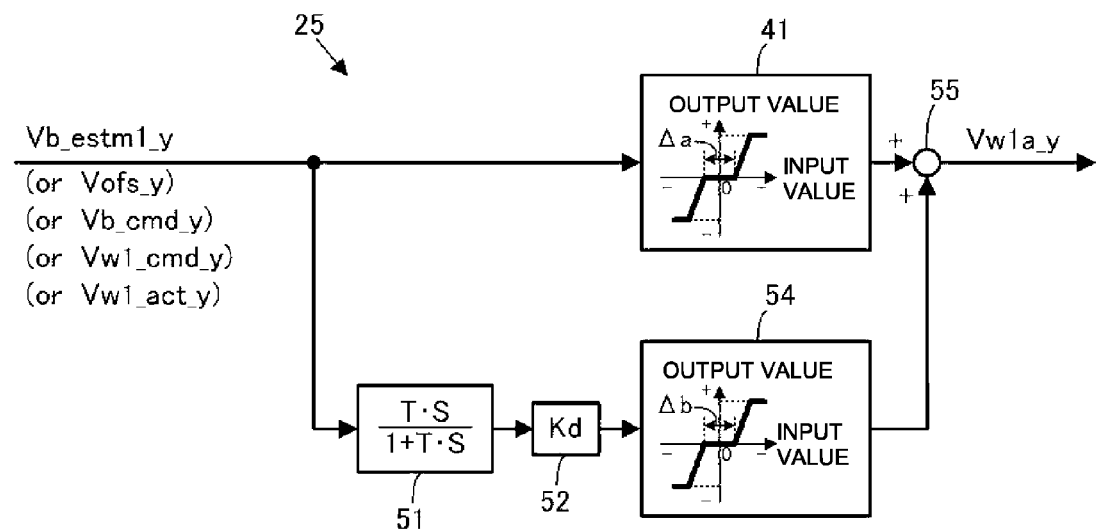

Next, FIG. 11(b) shows processing in which the second control processing unit 25 determines Vw1a_y (the target value of the speed after dead zone processing) according to the estimate value Vb_estm1_y of the moving speed in the Y-axis direction of the vehicle system center of gravity of the entirety in the third embodiment.

In this third embodiment, similarly to the first embodiment, the estimate value Vb_estm1_y of the moving speed in the Y-axis direction of the vehicle system center of gravity of the entirety is configured to be inputted to the processing unit 41.

Also, in the third embodiment, in addition to including the low-cut filter 51 and the processing unit 52 which are the same as those of the second embodiment, the second control processing unit 25 further includes a processing unit 54 that inputs the output of the processing unit 52. This processing unit 54 executes processing similar to that of the processing unit 41.

More specifically, when the absolute value of the input value of the processing unit 54 is comparatively small and the input value is a value within a predetermined range Ab with zero taken in the center (when the absolute value of the input value is equal to or less than a predetermined value determined beforehand), the processing unit 54 makes the output value zero.

Also, when the absolute value of the input value of the processing unit 54 is comparatively large and the input value is a value out of the predetermined range b (when the absolute value of the input value is larger than the predetermined value determined beforehand), the processing unit 54 sets the output value to a value that is not zero.

More specifically, the processing unit 54 determines the output value according to the input value of the processing unit 54 so that the absolute value of the output value thereof increases accompanying increase of the absolute value of the input value of the processing unit 54 in the range of a predetermined upper limit value or less. In this case, the polarity (direction) of the output value of the processing unit 54 is made same as that of the input value.

Also, the second control processing unit 25 in the third embodiment determines Vw1a_y by adding the output value of the processing unit 41 and the output value of the processing unit 54 by a calculation unit 55.

The third embodiment is the same as the first embodiment with respect to the items other than those described above.

In the third embodiment, Vw1a_y is determined by adding a component determined by the processing unit 41 according to the estimate value Vb_estm1_y of the moving speed in the Y-axis direction of the vehicle system center of gravity of the entirety and a component determined by the processing unit 54 according to the output of the low-cut filter 51 which becomes one according to the temporal change rate of Vb_estm1_y.

Therefore, similarly to the second embodiment, response of the turning behavior of the vehicle 1 can be improved with respect to movement in the Y-axis direction of the vehicle system center of gravity of the entirety accompanying movement of the upper body of the occupant.

Next, some of modifications of the respective embodiments described above will be described.

In the respective embodiments, a speed command component according to the temporal change rate (differential value) of the center of gravity shift amount Ofst_estm may be added to the target center of gravity speed Vb_cmd_xy.

For example, the temporal change rate of the center of gravity shift amount estimate value Ofst_estm_xy (or the center of gravity shift effect amount Vofs_xy that is proportionate to it) or a value obtained by multiplying the temporal change rate by a gain of a predetermined value is calculated as an additional speed command component Vb2_cmd. Also, a value obtained by adding this speed command component Vb2_cmd_xy to the target center of gravity speed Vb_cmd_xy calculated by the center of gravity target speed determination unit 32 is inputted to the attitude control calculation unit 34 instead of Vb_cmd_xy.

In this case, in the attitude control calculation unit 34, the target translational acceleration DVw1_cmd_xy of the first moving motion unit 3 can be calculated by an expression obtained by substituting (Vb_cmd_x+Vb2_cmd_x-Vofs_x), (Vb_cmd_y+Vb2_cmd_y-Vofs_y) for Vb_cmpn_cmd_x, Vb_cmpn_cmd_y, respectively in the expression (4a), (4b), or an expression obtained by substituting (Vb_cmd_x+Vb2_cmd_x), (Vb_cmd_y+Vb2_cmd_y) for Vb_cmd_x, Vb_cmd_y, respectively in the expression (4a)', (4b)'.

In doing so, acceleration and deceleration of the first moving motion unit 3 according to movement of the center of gravity of the occupant can be executed with higher sensitivity. As a result, the intention of the occupant with respect to movement of the vehicle 1 is more easily reflected to the behavior of the vehicle 1, and the steering performance of the vehicle 1 can be further improved.

Also, in the respective embodiments, in order that turning motion of the vehicle 1 is executed easily, the moving speed in the Y-axis direction of the second moving motion unit 4 was configured to be controlled by the electric motor 17. Alternatively, when turning motion of the vehicle 1 is to be executed, a brake force in the Y-axis direction may be imparted to the second moving motion unit 4 by an appropriate control device.

In doing so, speed control in the Y-axis direction of the second moving motion unit 4 becomes unnecessary, and a control device of a low cost can be employed. Also, in this case, it may be configured that the brake force imparted to the second moving motion unit 4 at the time of the turning motion of the vehicle 1 is adjusted according to the target turning angular velocity ωz_cmd_gc or the relative moving speed ΔVw2_cmd_y in the Y-axis direction of the second moving motion unit 4.

Further, instead of imparting the brake force to the second moving motion unit 4, the second moving motion unit 4 may be configured so as to smoothly slide only in the X-axis direction following the first moving motion unit 3, and to move in the Y-axis direction by sliding on the floor surface while receiving a friction force from the floor surface. For example, the second moving motion unit may be formed of a caster or a roller having only the rotation axis in the Y-axis direction.

In doing so, when the first moving motion unit 3 is to move in the Y-axis direction, the second moving motion unit 4 is braked by a friction force received from the floor surface. As a result, difference is caused between the moving speed in the Y-axis direction of the first moving motion unit 3 and the moving speed in the Y-axis direction of the second moving motion unit 4, and thereby turning motion of the vehicle 1 can be executed. Also, an actuator device for driving and braking the second moving motion unit 4 becomes unnecessary.

Further, in the vehicle 1 including the second moving motion unit 4 that is configured to move by sliding in the Y-axis direction on the floor surface as described above, it may be configured that the second moving motion unit 4 can smoothly tilts in the direction around the X-axis accompanying tilting in the direction around the X-axis of the first moving motion unit 3 by forming the second moving motion unit 4 so that the transverse cross-sectional shape (the transverse cross-sectional shape as viewed in the X-axis direction) of the grounding portion thereof becomes a shape smoothly rounded.

Furthermore, in this case, it may also be configured that the slip rate of the second moving motion unit 4 can be adjusted by adjusting the inclination correction amount θb_cmpn_y in the direction around the X-axis and the inclination angle in the direction around the X-axis of the second moving motion unit 4 at the time of turning motion of the vehicle 1.

For example, the inclination correction amount θb_cmpn_y is corrected so that the magnitude of the inclination correction amount θb_cmpn_y in the direction around the X-axis increases as the magnitude of the observed value of the moving speed (advancing speed) in the X-axis direction of the representative point (the vehicle system center of gravity of the entirety and the like) of the vehicle 1 at the time of the turning motion of the vehicle 1 is larger. Such correction can be executed for example by multiplying the inclination correction amount θb_cmpn_y calculated by the center of gravity adjustment unit 34c by a gain determined according to the observed value of the moving speed in the X-axis direction of the representative point of the vehicle 1.

Thus, it may be configured that the inclination angle (the inclination angle with respect to the vertical direction) in the direction around the X-axis of the second moving motion unit 4 can be increased as the magnitude of the moving speed (advancing speed) in the X-axis direction of the representative point of the vehicle 1 is larger, and the slip rate of the second moving motion unit 4 can be increased. As a result, as the magnitude of the moving speed (advancing speed) in the X-axis direction of the representative point of the vehicle 1 is larger, the turning radius of the vehicle 1 can be increased.

Also, in this case, the second moving motion unit 4 may be configured so that, as the magnitude of the inclination angle in the direction around the X-axis of the second moving motion unit 4 is larger, the radius of curvature of the grounding surface of the second moving motion unit 4 reduces. Or otherwise, it may be configured that the material of the second moving motion unit 4 changes according to the grounding position of the second moving motion unit 4 so that, as the inclination angle in the direction around the X-axis of the second moving motion unit 4 is larger, the coefficient of friction of the grounding surface of the second moving motion unit 4 increases. By doing so, as the magnitude of the inclination angle in the direction around X-axis of the second moving motion unit 4 is larger, degree of the increase of the slip rate of the second moving motion unit 4 can be increased.

Complementarily, processing of correcting the inclination correction amount θb_cmpn_y according to the moving speed (advancing speed) in the X-axis direction of the representative point of the vehicle 1 as described above may be employed in the first to third embodiments. More specifically, in each of the first to third embodiments, it may be configured that the inclination correction amount θb_cmpn_y is determined according to the center of gravity shift amount estimate value Ofst_estm_xy and the temporal change rate thereof, the yaw rate ωz_act, and the moving speed in the X-axis direction of the representative point of the vehicle 1.

In this case, by increasing the magnitude of the inclination correction amount θb_cmpn_y as the magnitude of the moving speed (advancing speed) in the X-axis direction of the representative point of the vehicle 1 is larger at the time of turning motion of the vehicle 1, it can be configured that, as a centrifugal force applied to the vehicle 1 is larger, the vehicle system center of gravity of the entirety can be shifted from the position of the balance state to the center side of the turning radius. Therefore, turning motion of the vehicle 1 can be executed smoothly while moving the vehicle 1 at a higher speed.

In the respective embodiments, it may configured that the third correction amount component θb_cmpn3_y of the inclination correction amount θb_cmpn_xy is determined according to the speed after dead zone processing Vw1a_y or the target turning angular velocity ωz_cmd_gc (the command value of the yaw rate) as a command of the turning request of the vehicle 1 instead of the yaw rate ωz_act.

Also, in the respective embodiments, it may be configured that the position of the vehicle system center of gravity of the entirety is adjusted according to only one or two out of the center of gravity shift amount estimate value Ofst_estm_xy (or the center of gravity shift effect amount Vofs_xy), the temporal change rate of the center of gravity shift amount estimate value Ofst_estm_xy (or the center of gravity shift effect amount Vofs_xy), and the measured value of the yaw rate ωz_act (or the command of the turning request) of the vehicle 1. More specifically, it may be configured that one of the first correction amount component θb_cmpn1_xy, the second correction amount component θb_cmpn2_xy, and the third correction amount component θb_cmpn3_xy is determined as the inclination correction amount θb_cmpn_xy, or otherwise, one obtained by adding two out of the first correction amount component θb_cmpn1_xy, the second correction amount component θb_cmpn2_xy, and the third correction amount component θb_cmpn3_xy is determined as the inclination correction amount θb_cmpn_xy.

Further, in this case also, it may be configured that the inclination correction amount θb_cmpn_xy is corrected according to the moving speed in the X-axis direction of the representative point of the vehicle 1.

Further, in the respective embodiments described above, in processing of the second control processing unit 25, as an indicator for determining presence/absence of the turning request or the degree of the turning request, the estimate value Vb_estm1_y of the moving speed in the Y-axis direction of the vehicle system center of gravity of the entirety calculated by the center of gravity speed estimation unit 33 was used. However, as the indicator for determining presence/absence of the turning request or the degree of the turning request, a parameter other than Vb_estm1_y may be used.

For example, the target turning angular velocity ωz_cmd_gc of the vehicle 1 may be determined by executing processing of the processing units 41, 42 similarly to the embodiments described above using the center of gravity shift effect amount Vofs_y (or the center of gravity shift amount estimate value Ofst_estm_y) in the Y-axis direction calculated by the center of gravity shift effect amount calculation unit 35b of the first control processing unit 24, or the post-restriction center of gravity target speed Vb_cmd_y in the Y-axis direction determined by the processing unit 32e, or the first target speed Vw1_cmd_y in the Y-axis direction of the first moving motion unit 3 determined by the attitude control calculation unit 34, or the observed value of the actual moving speed Vw1_act_y in the Y-axis direction of the first moving motion unit 3 (for example, a value of Vw1_act_y estimated from the detection value of the rotational speed of the electric motor 8b) instead of Vb_estm1_y as shown in the reference signs in parentheses of FIG. 9 or FIGS. 11(a) and 11(b).

Also, in this case, in the processing unit 41, the range Δa (the magnitude of the upper limit value and the lower limit value of the range Δa) of the value of the input parameter that makes the output value of the processing unit 41 zero and the change rate of the output value with respect to change in the value of the input parameter outside the range Δa are set for each of the various input parameters in general. This is similar also in the processing unit 54 shown in FIG. 11(b).

Even when such parameters as described above that substitute for Vb_estm1_y are used, similarly to the embodiments described above, the vehicle 1 can be turned according to movement in the right/left direction of the upper body of the occupant.

When the center of gravity shift effect amount Vofs_y in the Y-axis direction calculated by the center of gravity shift effect amount calculation unit 35b of the first control processing unit 24 is used instead of Vb_estm1_y, because the Vofs_y is proportionate to the center of gravity shift amount estimate value Ofst_estm_y in the Y-axis direction, to set the target turning angular velocity ωz_cmd_gc of the vehicle 1 according to Vofs_y is equivalent to set the target turning angular velocity ωz_cmd_gc of the vehicle 1 according to the center of gravity shift amount estimate value Ofst_estm_y in the Y-axis direction.

In this case, it can be configured that, even when a transverse moving command is outputted by the joy stick 12, turning according to it does not occur.

Also, in the respective embodiments described above, the distance L3 between the center of turning in turning of the vehicle 1 and the grounding part of the first moving motion unit 3 was changed according to the estimate value (observed value) Vb_estm_x of the moving speed in the front/rear direction of the vehicle system center of gravity of the entirety, however, L3 may be made a constant value determined beforehand.

Further, in the first embodiment, the target turning angular velocity ωz_cmd_gc was set to zero when the estimate value Vb_estm1_y of the moving speed in the Y-axis direction of the vehicle system center of gravity of the entirety as the input parameter of the processing unit 41 was a value within the predetermined range Δa in the vicinity of zero, however, the target turning angular velocity ωz_cmd_gc may be set so as to turn the vehicle 1 even when the input parameter is a value within the predetermined range Δa. That is, Δa may be made zero.

Also, in the respective embodiments described above, although the second moving motion unit 4 disposed on the rear side of the first moving motion unit 3 was shown, for example, the second moving motion unit 4 may be disposed on the front side of the first moving motion unit 3.

In the respective embodiments, the control device 21 may be configured so as to lower the steering sensitivity of the vehicle 1 in the warming up period from start of the vehicle 1 until a constant time elapses compared to that in the normal operation period thereafter. In order to lower the steering sensitivity of the vehicle 1, for example, the dead zone of the processing unit 32c (refer to FIG. 4) of the center of gravity target speed determination unit 32 forming the first control processing unit 24 is widened temporarily in the warming up period. Thus, the situation that the vehicle 1 starts to move in the warming up period can be avoided.

The control device 21 may be configured so as to lower the steering sensitivity of the vehicle 1 intermittently or continuously when abnormality is detected in the vehicle 1. Thus, such situation is avoided that the damage increases because the vehicle 1 is still used continuously even if abnormality occurs in the vehicle 1. The control device 21 may be configured so as to display presence/absence of abnormality detection or the kind of abnormality on the indicator or to make a speaker output the same by sound.

As the abnormality, a system error such as noise-originated communication abnormality of the control device 21, significant drop of the storage quantity of the on-vehicle battery, overheat of a constituting component of the vehicle 1, excessive supply current to electric equipment that is a constituting component of the vehicle 1, and the like can be cited. In order to lower the steering sensitivity of the vehicle 1, for example, at least one of a limit value in the X-axis direction and the Y-axis direction of the processing unit 32e of the center of gravity target speed determination unit 32 (refer to FIG. 5) forming the first control processing unit 24 and a limit value in the Y-axis direction of the processing unit 41 (refer to FIG. 9) forming the second control processing unit 25 is adjusted so as to gradually approach 0 after abnormality detection.

The control device 21 may be configured so as to raise the steering sensitivity of the vehicle 1 so as to approach the initial steering sensitivity according to state change after abnormality detection of the vehicle 1. Thus, movement of the vehicle 1 to the maintenance location and the like after occurrence of abnormality becomes possible or easy.

For example, when the event that the user gets down from the occupant riding section 5 is detected after a drop in the storage quantity of the battery is detected, the steering sensitivity of the vehicle 1 may be raised. When the event that the temperature of a constituting component of the vehicle 1 has dropped to a normal temperature is confirmed after overheat of the constituting component is detected, the steering sensitivity of the vehicle 1 may be raised. When the event that the supply current to a constituting component of the vehicle 1 has restored to a normal value is confirmed after excessive supply current to the constituting component of the vehicle 1 is detected, the steering sensitivity of the vehicle 1 may be raised.

In the respective embodiments, the joy stick 12 was used as an operation tool for outputting the advancing/retreating command and the transverse moving command. However, a track ball and a touch pad may be used instead of the joy stick, or otherwise, a load sensor detecting the contact position by the occupant, an attitude sensor held by the occupant, and the like may be used. Also, a portable terminal such as a smart phone for example can be used as the operation tool.

Further, the operation tool such as the joy stick 12 and the like may be omitted, or otherwise, an operation tool that outputs only the advancing/retreating command may be provided.

Also, the second moving motion unit 4 may have a structure other than the omni-wheel, or may have a structure similar to that of the first moving motion unit 3 for example.

Also, it may be configured to be capable of selecting to turn the vehicle 1 by that the occupant moves the body of the occupant himself or herself in the right/left direction by operation of a selection switch and the like by the occupant, and to turn the vehicle 1 by operation of an operation tool such as a joy stick by the occupant.

Further, when the vehicle 1 is turned according to operation of an operation tool such as a joy stick and the like, it may be configured that the target turning angular velocity in turning motion of the vehicle 1, or the moving speed in the Y-axis direction or the turning radius and the like of the first moving motion unit 3 can be designated in the control device 21 by operation of the operation tool.

Also, the inverted pendulum type vehicle may include the first moving motion unit 3 only without including the second moving motion unit 4.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims

What is claimed is:

1. An inverted pendulum vehicle comprising:
 a moving motion unit configured to be capable of moving in all directions on a floor surface;
 an actuator device for driving the moving motion unit;
 a base that incorporates the moving motion unit and the actuator devices;
 an occupant riding section incorporated into the base so as to be tiltable with respect to a vertical direction;
 a tilting state detection unit for detecting the tilting state of the occupant riding section;
 a control device configured for controlling the motion of the actuator devices to balance the position of a center of gravity of the entirety of an occupant riding on the occupant riding section and the inverted pendulum vehicle according to the tilting state of the occupant riding section detected at least by the tilting state detection unit;
 the inverted pendulum vehicle further includes vehicle state detection units for detecting a predetermined kind of state of the inverted pendulum vehicle for recognizing a moving request of the center of gravity of the occupant riding on the occupant riding section;
 the control device is configured to control the actuator devices so that the position of the center of gravity of the entirety of the occupant riding on the occupant riding section and the inverted pendulum vehicle is shifted from the position of a balance state of the center of gravity of the entirety in the direction of a request for movement of the center of gravity of the occupant recognized from a state detected by the vehicle state detection units;
 wherein the predetermined kind of state detected by the vehicle state detection units includes at least one of:
  a command of a turning request of the inverted pendulum vehicle by the occupant riding on the occupant riding section;
  a measured value of an actual yaw rate of the inverted pendulum vehicle;
  a center of gravity of the entirety moving amount that is a relative moving amount of the center of gravity of the entirety with respect to the occupant riding section generated because the occupant riding on the occupant riding section relatively shifts the center of gravity of the occupant with respect to the occupant riding section; and
  a temporal change rate of the center of gravity of the entirety moving amount;
 wherein the predetermined kind of state detected by the vehicle state detection units includes the center of gravity of the entirety moving amount or a temporal change rate of the center of gravity of the entirety moving amount; and
 the control device is configured to control the actuator devices wherein the larger the magnitude of the center of gravity of the entirety moving amount or the magnitude of the temporal change rate of the center of gravity of the entirety moving amount is, the shift amount of the position of the center of gravity of the entirety increases toward the direction the same as the center of gravity of the entirety moving amount or the direction the same as the temporal change rate of the center of gravity of the entirety moving amount.

2. The inverted pendulum vehicle according to claim 1, wherein the vehicle state detection units includes a yaw rate sensor for outputting an angular velocity around a yaw axis of the vehicle based on a detection signal of the angular velocity sensor.

3. The inverted pendulum vehicle according to claim 1, wherein the control device is configured to control the actuator devices to change a shift amount of the center of gravity of the entirety from the position of the balance state according to a state detected by the vehicle state detection units or according to the state and the moving speed of a representative point of the inverted pendulum vehicle.

4. The inverted pendulum vehicle according to claim 1, wherein the predetermined kind of state detected by the vehicle state detection units includes the command of the turning request or the measured value of the yaw rate; and
the control device is configured to control the actuator devices so that the larger the magnitude of a request value of the yaw rate of the inverted pendulum vehicle shown by the command of the turning request or the magnitude of the measured value of the yaw rate is, the more the shift amount of the center of gravity of the entirety from the position of the balance state increases toward the center side of the turning radius of the inverted pendulum vehicle.

5. The inverted pendulum vehicle according to claim 1, wherein the tilting state detection unit includes an acceleration sensor and an angular velocity sensor for detecting the tilting state of the occupant riding section.

6. The inverted pendulum vehicle according to claim 5, wherein the angular velocity sensor is a gyro-sensor.

7. The inverted pendulum vehicle according to claim 5, wherein an output from the acceleration sensor and the angular velocity sensor are inputted to the control device for determining a measured value of an inclination angle of the occupant riding the section.

8. An inverted pendulum vehicle comprising:
a moving motion unit configured to be capable of moving in all directions on a floor surface with an actuator device for driving the moving motion unit;
an occupant riding section incorporated into a base, said occupant riding section being tiltable with respect to a vertical direction;
a tilting state detection unit for detecting a tilting state of the occupant riding section;
a control device configured for controlling the motion of the actuator device so as to balance the position of a center of gravity of the entirety of an occupant riding on the occupant riding section and the inverted pendulum vehicle according to the tilting state of the occupant riding section detected at least by the tilting state detection unit;
the inverted pendulum vehicle further includes vehicle state detection units for detecting a moving request of the center of gravity of the occupant riding on the occupant riding section;
the control device is configured to control the actuator devices wherein the position of the center of gravity of the entirety of the occupant riding on the occupant riding section and the inverted pendulum vehicle is shifted from the position of a balance state of the center of gravity of the entirety in the direction of a request for movement of the center of gravity of the occupant recognized from a state detected by the vehicle state detection units;
said predetermined kind of state detected by the vehicle state detection units includes at least one of:
a command of a turning request of the inverted pendulum vehicle by the occupant riding on the occupant riding section;
a measured value of an actual yaw rate of the inverted pendulum vehicle;
a center of gravity of the entirety moving amount that is a relative moving amount of the center of gravity of the entirety with respect to the occupant riding section generated because the occupant riding on the occupant riding section relatively shifts the center of gravity of the occupant with respect to the occupant riding section; and
a temporal change rate of the center of gravity of the entirety moving amount;
wherein the predetermined kind of state detected by the vehicle state detection units includes the center of gravity of the entirety moving amount or a temporal change rate of the center of gravity of the entirety moving amount; and
the control device is configured to control the actuator devices wherein the larger the magnitude of the center of gravity of the entirety moving amount or the magnitude of the temporal change rate of the center of gravity of the entirety moving amount is, the shift amount of the position of the center of gravity of the entirety increases toward the direction the same as the center of gravity of the entirety moving amount or the direction the same as the temporal change rate of the center of gravity of the entirety moving amount.

9. The inverted pendulum vehicle according to claim 8, wherein the vehicle state detection units includes a yaw rate sensor for outputting an angular velocity around a yaw axis of the vehicle based on a detection signal of the angular velocity sensor.

10. The inverted pendulum vehicle according to claim 8, wherein the tilting state detection unit includes an acceleration sensor and an angular velocity sensor for detecting the tilting state of the occupant riding section.

11. The inverted pendulum vehicle according to claim 10, wherein the angular velocity sensor is a gyro-sensor.

12. The inverted pendulum vehicle according to claim 10, wherein an output from the acceleration sensor and the angular velocity sensor are inputted to the control device for determining a measured value of an inclination angle of the occupant riding the section.

13. The inverted pendulum vehicle according to claim 8, wherein the control device is configured to control the actuator devices to change a shift amount of the center of gravity of the entirety from the position of the balance state according to a state detected by the vehicle state detection units or according to the state and the moving speed of a representative point of the inverted pendulum vehicle.

14. The inverted pendulum vehicle according to claim 8, wherein the predetermined kind of state detected by the vehicle state detection units includes the command of the turning request or the measured value of the yaw rate; and
the control device is configured to control the actuator devices so that the larger the magnitude of a request value of the yaw rate of the inverted pendulum vehicle shown by the command of the turning request or the magnitude of the measured value of the yaw rate is, the more the shift amount of the center of gravity of the entirety from the position of the balance state increases toward the center side of the turning radius of the inverted pendulum vehicle.

* * * * *